(12) United States Patent
Kurogi

(10) Patent No.: US 11,533,835 B2
(45) Date of Patent: Dec. 27, 2022

(54) WORKING VEHICLE

(71) Applicant: KUBOTA CORPORATION, Osaka (JP)

(72) Inventor: Toshiaki Kurogi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/351,293

(22) Filed: Jun. 18, 2021

(65) Prior Publication Data

US 2021/0307230 A1 Oct. 7, 2021

Related U.S. Application Data

(63) Continuation of application No. PCT/JP2019/049651, filed on Dec. 18, 2019.

(30) Foreign Application Priority Data

Dec. 26, 2018 (JP) .............................. JP2018-243533

(51) Int. Cl.
*A01B 69/00* (2006.01)
*B60Q 1/00* (2006.01)
(Continued)

(52) U.S. Cl.
CPC .......... *A01B 69/001* (2013.01); *B60Q 1/0023* (2013.01); *B60Q 1/12* (2013.01);
(Continued)

(58) Field of Classification Search
CPC ............ B60Q 1/0023; B60Q 2300/314; B60Q 2300/12; B60Q 2300/124; B60Q 2300/126; B60Q 2300/128
See application file for complete search history.

(56) References Cited

U.S. PATENT DOCUMENTS 6,947,576 B2 * 9/2005 Stam ...................... G06V 20/10
 382/104
9,789,808 B1 * 10/2017 Hong ...................... B60Q 1/085
(Continued)

FOREIGN PATENT DOCUMENTS

EP 2 158 799 B1 8/2012
EP 3 092 882 A1 11/2016
(Continued)

OTHER PUBLICATIONS

Official Communication issued in International Patent Application No. PCT/JP2019/049651, dated Feb. 25, 2020.
(Continued)

*Primary Examiner* — Robert J May
(74) *Attorney, Agent, or Firm* — Keating and Bennett, LLP

(57) ABSTRACT

A working vehicle is capable of autonomously traveling on a target traveling route and appropriately performing illumination during autonomous traveling to enable an operator to reliably confirm the presence of obstacles or the like on the target traveling route. The working vehicle includes a traveling body to autonomously travel on the target traveling route, illumination lamps located on the traveling body to respectively illuminate different directions, and a controller to change a control relating to a way of turning on the illumination lamps during the autonomously traveling.

10 Claims, 27 Drawing Sheets

(51) Int. Cl.
*B60Q 1/12* (2006.01)
*B60R 11/04* (2006.01)

(52) U.S. Cl.
CPC ........ *B60R 11/04* (2013.01); *B60Q 2300/122* (2013.01); *B60Q 2300/314* (2013.01); *B60R 2300/50* (2013.01); *B60Y 2200/221* (2013.01)

(56) References Cited

U.S. PATENT DOCUMENTS

| | | |
|---|---|---|
| 2016/0009218 A1 | 1/2016 | Nakashima |
| 2017/0322550 A1 | 11/2017 | Yokoyama |
| 2018/0222492 A1 | 8/2018 | Takii et al. |
| 2018/0236928 A1 | 8/2018 | Fritz et al. |
| 2018/0334099 A1* | 11/2018 | Gao ................ H04N 5/232 |
| 2019/0016257 A1 | 1/2019 | Sakata et al. |
| 2019/0241119 A1 | 8/2019 | Takeda et al. |

FOREIGN PATENT DOCUMENTS

| | | |
|---|---|---|
| EP | 3 718 387 A1 | 10/2020 |
| JP | 05-303901 A | 11/1993 |
| JP | 2000-071870 A | 3/2000 |
| JP | 2003-341424 A | 12/2003 |
| JP | 2004-161270 A | 6/2004 |
| JP | 2005-056727 A | 3/2005 |
| JP | 2010-157101 A | 7/2010 |
| JP | 2014-036399 A | 2/2014 |
| JP | 2016-016780 A | 2/2016 |
| JP | 2016-094093 A | 5/2016 |
| JP | 2018-049573 A | 3/2018 |
| JP | 2018-177043 A | 11/2018 |
| JP | 2018-185236 A | 11/2018 |
| WO | 2017/073636 A1 | 5/2017 |
| WO | 2017/138148 A1 | 8/2017 |

OTHER PUBLICATIONS

Official Communication issued in corresponding European Patent Application No. 19902301.1, dated Aug. 26, 2022.
Official Communication issued in corresponding Japanese Patent Application No. 2018-243533, dated Aug. 23, 2022.

* cited by examiner

Fig.6

| Illuminating pattern | Head lamp | | Work lamp | | | | | |
|---|---|---|---|---|---|---|---|---|
| | 1 | 2 | 1 | 2 | 3 | 4 | 5 | 6 |
| 1 | ○ | ○ | ○ | ○ | ○ | ○ | ○ | ○ |
| 2 | ○ | ○ | ○ | ○ | × | × | × | × |
| 3 | × | ○ | × | ○ | × | ○ | × | ○ |
| 4 | ○ | × | ○ | × | ○ | × | ○ | × |
| 5 | ○ | ○ | ○ | ○ | × | × | ○ | ○ |
| 6 | ○ | ○ | ○ | ○ | ○ | × | ○ | ○ |
| 7 | × | × | × | ○ | × | ○ | × | ○ |
| 8 | ○ | ○ | × | ○ | × | ○ | × | ○ |

Fig.9

| Target direction to be set as subsequent traveling direction | Working-trace direction | Illuminating pattern |
|---|---|---|
| Forward | Rearward | 5 |
| Forward | Leftward Rearward | 6 |
| ⋮ | ⋮ | ⋮ |

T2

WORKING VEHICLE

CROSS REFERENCE TO RELATED APPLICATIONS

This application is a continuation application of International Application No. PCT/JP2019/049651, filed on Dec. 18, 2019, which claims the benefit of priority to Japanese Patent Application No. 2018-243533, filed on Dec. 26, 2018. The entire contents of each of these applications are hereby incorporated herein by reference.

BACKGROUND OF THE INVENTION

1. Field of the Invention

The present invention relates to a working vehicle including illumination lamps.

2. Description of the Related Art

A working vehicle disclosed in Japanese Unexamined Patent Application Publication No. 2014-36399 is known.

The working vehicle disclosed in Japanese Unexamined Patent Application Publication No. 2014-36399 has a camera device to capture surroundings of the vehicle, an illuminance sensor that detects illuminance in a capturing direction of the camera device, an illuminating device to illuminate the capturing direction of the camera device, and a camera module controller to control these components. The camera module controller has an illuminating device automatic lighting means to automatically light the illuminating device for lighting when an illuminance detected by the illuminance sensor is lower than a predetermined illuminance.

SUMMARY OF THE INVENTION

In an aspect of a preferred embodiment of the present invention, a working vehicle includes a traveling body to autonomously travel on a target traveling route, a plurality of illumination lamps located on the traveling body to respectively illuminate different directions, and a controller configured or programmed to change a control relating to a way of lighting the illumination lamps during the autonomously traveling.

Before the traveling body changes direction, the controller is configured or programmed to selectively light at least one of the illumination lamps based on the target traveling route so that the selectively lighted at least one illumination lamp illuminates a target direction to be set as a subsequent traveling direction after the changing direction.

The working vehicle includes a camera located on the traveling body to capture an image of surroundings of the traveling body, a grader to grade a clearness of the image captured by the camera, and a display to display the image captured by the camera. The controller is configured or programmed to change the control relating to the way of lighting the illumination lamps based on the clearness graded by the grader.

The controller is configured or programmed to selectively light at least one of the illumination lamps to illuminate a capturing direction of the camera, based on the clearness graded by the grader.

The controller is configured or programmed to change an illuminance of the illumination lamp illuminating the capturing direction of the camera, based on the clearness graded by the grader.

The controller is configured or programmed to include a storage to store a plurality of illuminating patterns each of which defines a combination of the illumination lamps including one or more illumination lamps to be lighted and other one or more illumination lamps to be extinguished, and an illuminating pattern selector to select, based on the target traveling route, one of the illuminating patterns stored in the storage so as to illuminate a target direction to be set as a subsequent traveling direction for the traveling body after the changing direction.

The working vehicle includes an illuminance sensor to measure an illuminance around the traveling body. The illuminating pattern selector is configured or programmed to select one of the illuminating patterns based on the illuminance measured by the illuminance sensor.

The working vehicle includes a camera located on the traveling body to capture an image of surroundings of the traveling body, and a display to display the image captured by the camera. The controller is configured or programmed to include an image quality estimator to estimate, based on the illuminance measured by the illuminance sensor, an image quality of an image to be displayed on the display, and the illuminating pattern selector is configured or programmed to select one of the illuminating patterns so that the image quality estimated by the image quality estimator satisfies a predetermined condition where the image quality fits for recognition of a captured object.

The working vehicle includes a cabin mounted on the traveling body, the illumination lamps include a plurality of work lamps attached to an upper portion of the cabin.

The illumination lamps include a plurality of head lamps attached to a front portion of the traveling body.

The display is a mobile terminal capable of being arranged at a position separating from the traveling body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6 is a view showing an example of an illuminating pattern table.

FIG. 9 is a view showing further another example of the relation table.

DETAILED DESCRIPTION OF THE PREFERRED EMBODIMENTS

Figure 1:
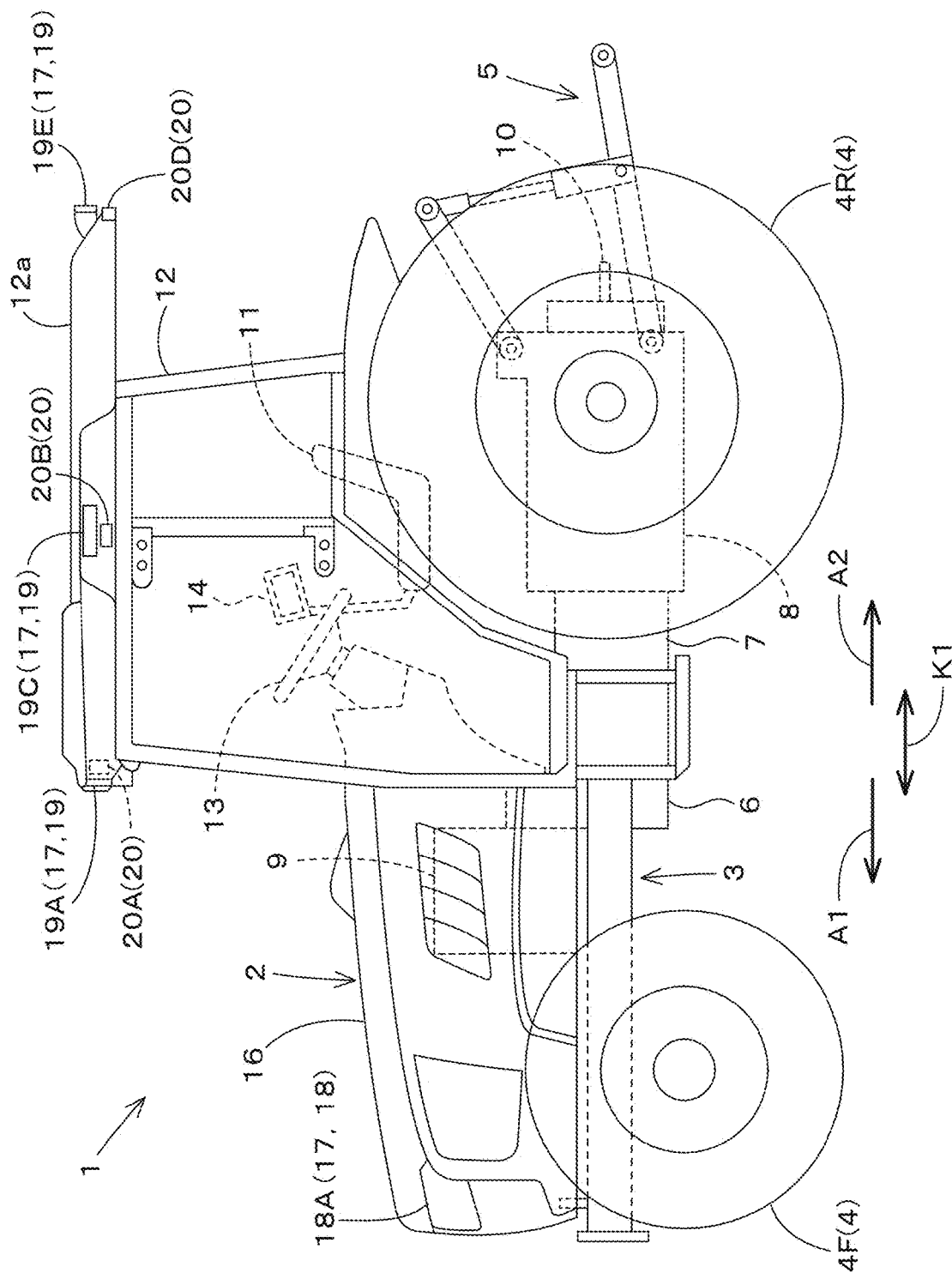
FIG. 1 is a side view showing a working vehicle according to a preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

Figure 2:
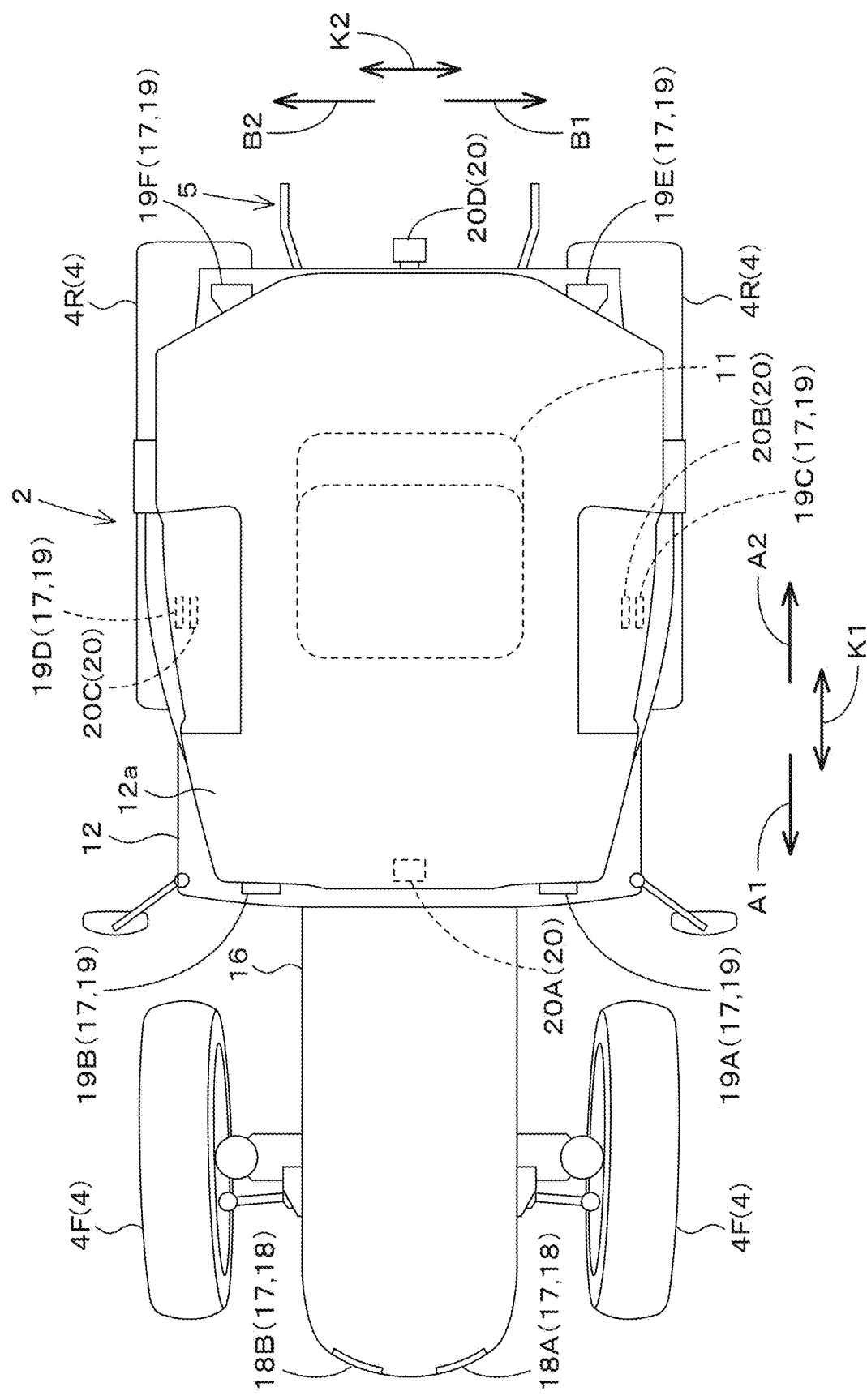
FIG. 2 is a plan view showing a working vehicle according to a preferred embodiment of the present invention.

FIG. 1 is a side view showing a working vehicle 1 according to a preferred embodiment of the present invention, and FIG. 2 is a plan view showing the working vehicle 1 according to the present preferred embodiment. The working vehicle 1 according to the present preferred embodiment is a tractor 1, the present preferred embodiment will be explained below assuming that the working vehicle 1 is a tractor 1. However, the working vehicle 1 is not limited to tractors.

In the following description, a forward direction of a driver sitting on a driver seat 11 of the tractor 1 (a direction of an arrowed line A1 in FIG. 1 and FIG. 2) is referred to as the front, a rearward direction of the driver (a direction of an arrowed line A2 in FIG. 1 and FIG. 2) is referred to as the rear, a leftward direction of the driver (a direction of an arrowed line B1 in FIG. 2) is referred to as the left, and a rightward direction of the driver (a direction of an arrowed line B2 in FIG. 2) is referred to as the right. In the description, a horizontal direction (a direction of an arrowed line K2 in FIG. 2) orthogonal to a fore-and-aft direction (a direction of an arrowed line K1 in FIG. 1 and FIG. 2) of the tractor 1 is referred to as a machine width direction.

As shown in FIGS. 1 and 2, the tractor 1 includes a vehicle body 3, a traveling device 4, and an attachment 5. The vehicle body 3 includes a vehicle frame 6, a clutch housing 7, and a transmission case 8. The vehicle frame 6 extends in the fore-and-aft direction of the vehicle body 3. A prime mover 9 is mounted on the vehicle frame 6. In this preferred embodiment, the prime mover 9 is an engine 9. The clutch housing 7 is connected to a rear portion of the engine 9 and houses a clutch. The transmission case 8 is connected to a rear portion of the clutch housing 7 and houses a transmission device, a rear-wheel differential device, and the like. The transmission device includes a main transmission device and a sub transmission device. A PTO shaft 10 protrudes from a rear portion of the vehicle body 3 (behind the transmission case 8).

The traveling device 4 includes front wheels 4F located at a front portion of the vehicle body 3 and rear wheels 4R located at a rear portion of the vehicle body 3. The front wheels 4F are supported by the vehicle frame 6. The rear wheels 4R are supported by an output shaft of the rear-wheel differential device. The vehicle body 3 and the traveling device 4 define and function as a traveling body 2 to travel.

A driver seat 11 and a cabin 12 that surrounds the driver seat 11 are mounted on the vehicle body 3. A steering wheel 13 is located in front of the driver seat 11. The steering wheel 13 is linked to the left and right front wheels 4F with a power steering mechanism. A display 14 is located on surroundings (right front) of the driver seat 11. The display 14 may be, for example, a touch panel type liquid crystal display (a liquid crystal monitor).

A hood 16 is located at a front portion of the vehicle body 3. The hood 16 defines an engine compartment that houses the engine 9 and other components in the front portion of the vehicle body 3.

The hood 16 is provided openably so that the front portion can be raised and lowered with the rear portion as a fulcrum.

The attachment 5 is located at a rear portion of the vehicle body 3. The attachment 5 connects a ground working machine, which performs working on the ground (an agricultural field), to a rear portion of the tractor 1. The ground working machine is driven by a driving power transmitted from the PTO shaft 10. Rotary cultivators, grass cutters, sprayers (spraying fertilizers, chemicals, and the like), and sowing machines can be exemplified as the ground working machine, but the ground working machine is not limited thereto. The attachment 5 is a lifting device configured to be driven by an actuator such as a hydraulic cylinder to lift and lower the ground working machine. The attachment 5 includes a three-point linkage mechanism.

As shown in FIGS. 1 and 2, the tractor 1 includes a plurality of illumination lamps 17.

The plurality of illumination lamps 17 are located on the traveling body 2. The plurality of illumination lamps 17 respectively illuminate different directions. The plurality of illumination lamps 17 include a head lamp 18 and a work lamp 19.

The head lamp 18 is located at a front portion of the traveling body 2. The head lamp 18 includes a first head lamp 18A and a second head lamp 18B. The first head lamp 18A is located leftward on a front portion of the hood 16 and is capable of illuminating a left area in front of the tractor 1. The second head lamp 18B is located rightward on the front portion of the hood 16 and is capable of illuminating a right area in front of the tractor 1.

A work lamp 19 is located on a roof 12a, which defines an upper portion of the cabin 12. The work lamp 19 includes a first work lamp 19A, a second work lamp 19B, a third work lamp 19C, a fourth work lamp 19D, a fifth work lamp 19E, and a sixth work lamp 19F. Each of the work lamps (that is, the first work lamp 19A, the second work lamp 19B, the third work lamp 19C, the fourth work lamp 19D, the fifth work lamp 19E, and the sixth work lamp 19F) are arranged in an inclining posture in which an illuminating direction is obliquely downward.

The first work lamp 19A is located leftward on a front portion of the roof 12a and capable of illuminating an obliquely-leftward area in front of the tractor 1. The second work lamp 19B is located rightward on the front portion of the roof 12a and capable of illuminating an obliquely-rightward area in front of the tractor 1. The third work lamp 19C is located on a left portion of the roof 12a and capable of illuminating a left area of the tractor 1. The fourth work lamp 19D is located on a right portion of the roof 12a and capable of illuminating a right area of the tractor 1. The fifth work lamp 19E is located leftward on a rear portion of the roof 12a and capable of illuminating an obliquely-leftward area behind the tractor 1. The sixth work lamp 19E is located rightward on the rear portion of the roof 12a and capable of illuminating an obliquely-rightward area behind the tractor 1.

Figure 3A:
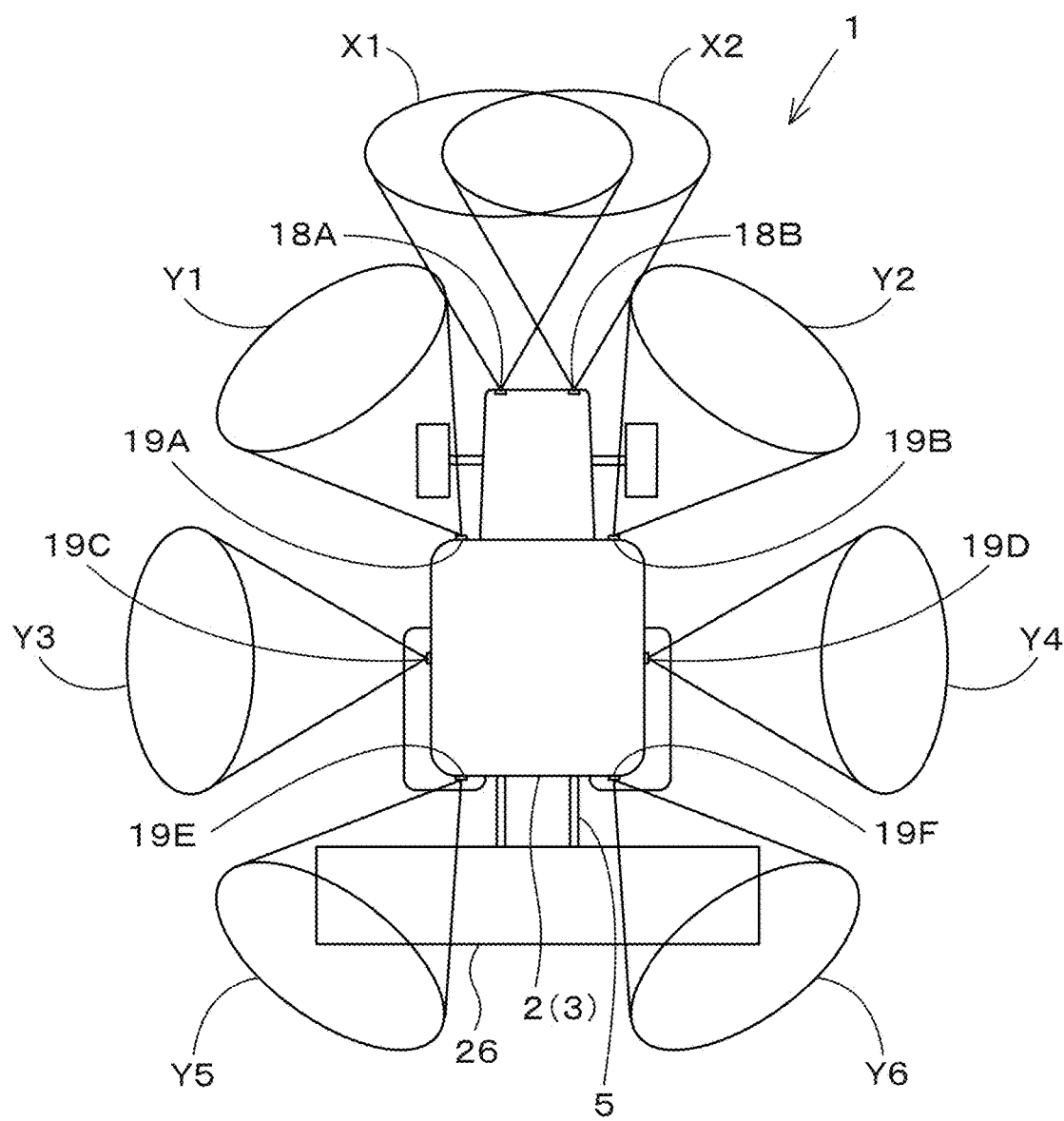
FIG. 3A is a plan view showing an example of an illuminating pattern of illumination lamp (a first illuminating pattern).

FIG. 3A is a plan view schematically showing illuminating directions and illuminating areas of the illumination lamps 17 (that is, the head lamps 18 and work lamps 19). The illuminating direction and illuminating area of the first head lamp 18A is indicated by a reference symbol X1. The illuminating direction and illuminating area of the second head lamp 18B are indicated by a reference symbol X2. The illuminating direction and illuminating area of the first work lamp 19A are indicated by a reference symbol Y1. The illuminating direction and illuminating area of the second work lamp 19B are indicated by a reference symbol Y2. The illuminating direction and illuminating area of the third work lamp 19C are indicated by a reference symbol Y3. The illuminating direction and illuminating area of the fourth work lamp 19D are indicated by a reference symbol Y4. The illuminating direction and illuminating area of the fifth work lamp 19E are indicated by a reference symbol Y5. The illuminating direction and illuminating area of the sixth work lamp 19F are indicated by a reference symbol Y6.

However, the illuminating direction and illuminating area shown in FIG. 3A are just exemplified for the purpose of explanation, and can be changed as necessary.

It is preferred that the illumination lamps 17 (that is, the head lamp 18 and the work lamp 19) include an illuminance changing mechanism configured to change the illuminances (brightness) thereof. In addition, the illumination lamps 17 (that is, the head lamp 18 and the work lamp 19) may have an orientation changing mechanism configured to change the illuminating directions thereof.

As shown in FIGS. 1 and 2, the tractor 1 includes a plurality of cameras 20.

The plurality of cameras 20 are located on the traveling body 2 and capture images of the surroundings of the traveling body 2. The cameras 20 are located on the roof 12a of the cabin 12. The cameras 20 are, for example, wide-angle CCD cameras for visible light. The camera 20 includes a first camera 20A, a second camera 20B, a third camera 20C, and a fourth camera 20D. Each of the cameras (that is, the first camera 20A, the second camera 20B, the third camera 20C, and the fourth camera 20D) is arranged in an inclining posture in which a capturing direction is obliquely downward.

The first camera 20A is located at the front portion of the roof 12a and between the first work lamp 19A and the second work lamp 19B, and is capable of capturing an area in front of the tractor 1. The second camera 20B is located at the left portion of the roof 12a and in the vicinity of the third work lamp 19C, and is capable of capturing a left area of the tractor 1. The third camera 20C is located at the right portion of the roof 12a and in the vicinity of the fourth work lamp 19D, and is capable of capturing a right area of the tractor 1. The fourth camera 20D is located at the rear portion of the roof 12a and between the fifth work lamp 19E and the sixth work lamp 19F, and is capable of capturing an area behind the tractor 1.

In the present preferred embodiment, the number of work lamps 19 is six, but the number is not limited to six, as long as the work lamps are capable of emitting lights to at least the front, rear, left, and right of the tractor 1. For example, the number of work lamps 19 may be four or eight. However, the number and directions of the work lamps 19 should be determined to the number and directions in which the lights can be emitted to all the areas captured by the plurality of cameras 20.

In the present preferred embodiment, the number of cameras 20 is four, but it is not limited to four, and may be five or more (for example, six or eight). However, the number and directions of the cameras 20 are determined to the number and directions in which at least the front, rear, left and right areas of the tractor 1 can be captured.

Figure 4:
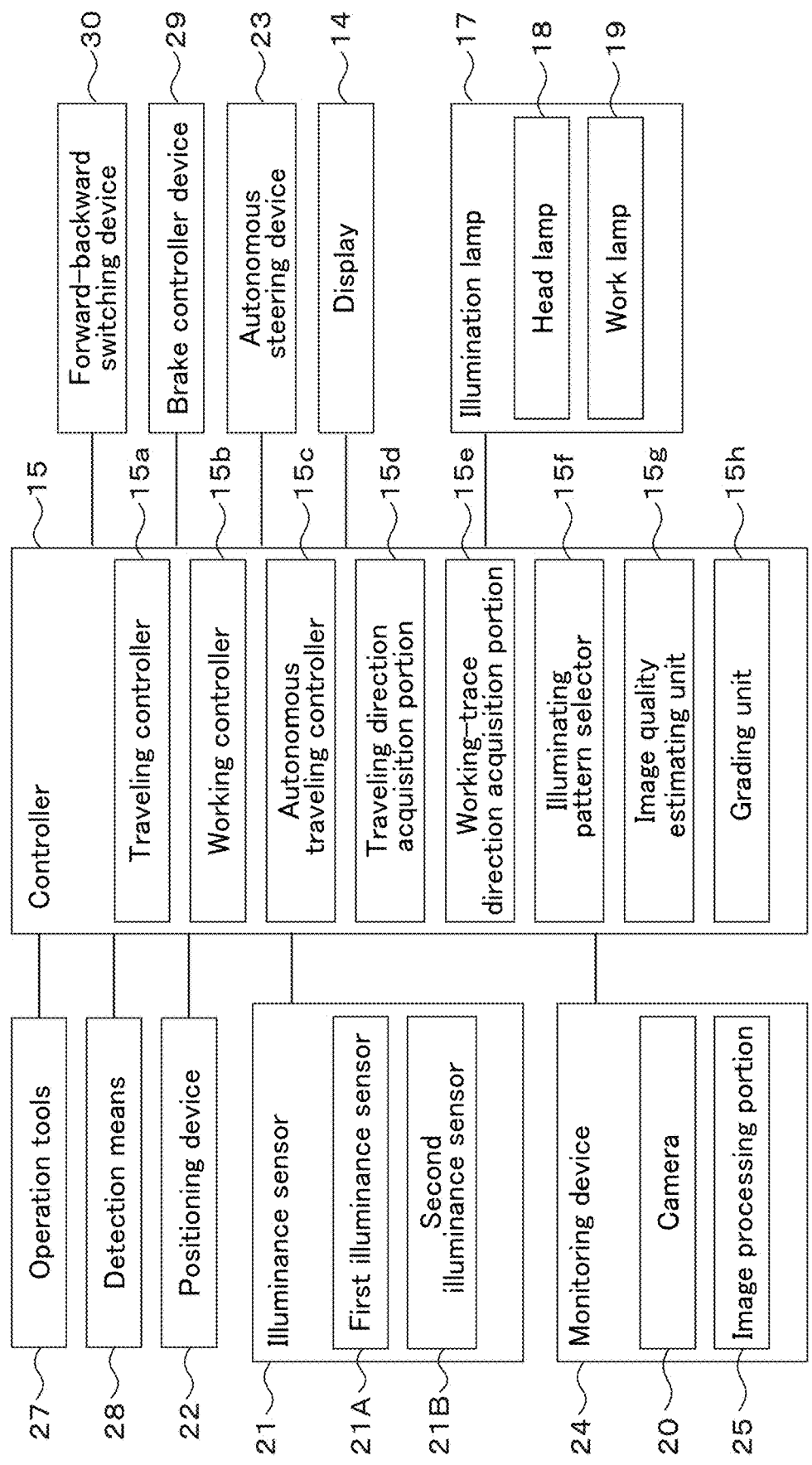
FIG. 4 is a block diagram showing a schematic diagram of a control system of a working vehicle according to a preferred embodiment of the present invention.

As shown in FIG. 4, the tractor 1 includes an illuminance sensor 21. Although not shown in the drawings, the illuminance sensor 21 is located on the traveling body 2 and measures illuminance of the surroundings of the traveling body 2. The illuminance sensor 21 includes a first illuminance sensor 21A to measure illuminance in the capturing directions of the cameras 20, and a second illuminance sensor 21B to measure illuminance in a direction (for example, above the cabin 12) other than the capturing directions of the cameras 20.

For example, when the capturing directions of the cameras 20 are illuminated by the illumination lamps 17 after sunset, the illuminance measured by the first illuminance sensor 21A is larger (brighter) than the illuminance measured by the second illuminance sensor 21B.

As shown in FIG. 4, the tractor 1 includes a controller (ECU) 15 configured or programmed to control a traveling system and a working system. The controller 15 is configured or programmed to include a computing unit (that is, CPU or the like) and a storage unit (that is, a memory), and the like, and executes each of controls to be described below based on various types of control programs stored in the storage unit. Specifically, the controller 15 is configured or programmed to control the traveling system, the working system, and the like of the tractor 1 based on operation signals outputted when various types of operation tools (that is, levers, switches, dials, and the like) 27 located around the driver seat 11 are operated and on detection signals of various types of detectors (that is, sensors and the like) 28 mounted on the vehicle body 3, the ground working machine, and the like. In addition, the controller 15 changes the control relating to a way of lighting the illumination lamps 17 (that is, the head lamp 18 and the work lamps 19) in autonomous traveling of the tractor 1 (traveling body 2). The changing of control relating to a way of lighting of the illumination lamps 17 includes a control to switch the illumination lamps 17 from being extinguished to being lighted, a control to switch the illumination lamps 17 from being lighted to being extinguished, and a control to change illuminances (brightness) of the illumination lamps 17.

The controller 15 is configured or programmed to include a traveling controller 15a and a working controller 15b.

The traveling controller 15a includes a control program to perform a control relating to traveling, and perform a control relating to traveling of the vehicle body 3 based on the control program.

The traveling controller 15a executes, for example, a control of revolving speed of the engine 9 based on a detection signal output from the accelerator pedal sensor, which is one of the detectors 28, and a control of a forward-backward switching device 30 based on a detection signal output from the forward-backward switching lever, which is one of the operation tools 27. The working controller 15b includes a control program to execute a control relating to the ground working machine, and to execute the control relating to the ground working machine. The working controller 15b, for example, executes a control relating to lifting and lowering of the attachment 5 (that is, lifting and lowering of the ground working machine) based on an operation signal output from the operation tool 27.

The tractor 1 includes a positioning device 22 and an autonomous steering device 23.

The positioning device 22 measures a position and azimuth of the traveling body 2 (that is, the vehicle body 3) with the Global Navigation Satellite System (referred to as GNSS). In detail, the positioning device 22 acquires a position and orientation of the traveling body 2 (that is, the vehicle body 3) based on positioning data acquired by receiving radio waves from the GNSS satellites and other positioning data transmitted from a reference station.

The positioning device 22 includes a receiving device and an inertial measurement unit (referred to as IMU). The receiving device includes an antenna or the like and receives satellite signals transmitted from the positioning satellites. The receiver device is attached, for example, to an upper portion of the cabin 12 of the vehicle body 3. The inertial measurement unit has an acceleration sensor to detect an acceleration, a gyro sensor to detect an angular velocity, and the like. The inertial measurement unit is located below the driver seat 11 of the vehicle body 3, for example, and is capable of detecting a roll angle, a pitch angle, a yaw angle, and the like of the traveling body 2.

The autonomous steering device 23 steers the left and right front wheels 4F by maintaining or changing a rotation angle of a rotation shaft of a steering motor of a power steering unit based on a control signal output from the controller 15.

The tractor 1 includes a changeover switch, one of the operation tools 27, capable of switching between a manual driving mode and the autonomous driving mode. The controller 15 is configured or programmed to include an autonomous traveling controller 15c to perform a control relating to autonomous traveling of the traveling body 2 when the changeover switch is switched to the automatic driving mode. The autonomous traveling controller 15c has a control program to perform a control relating to autonomous traveling of the traveling body 2, and to perform a control relating to autonomous traveling of the traveling body 2 based on the control program.

Figure 5:
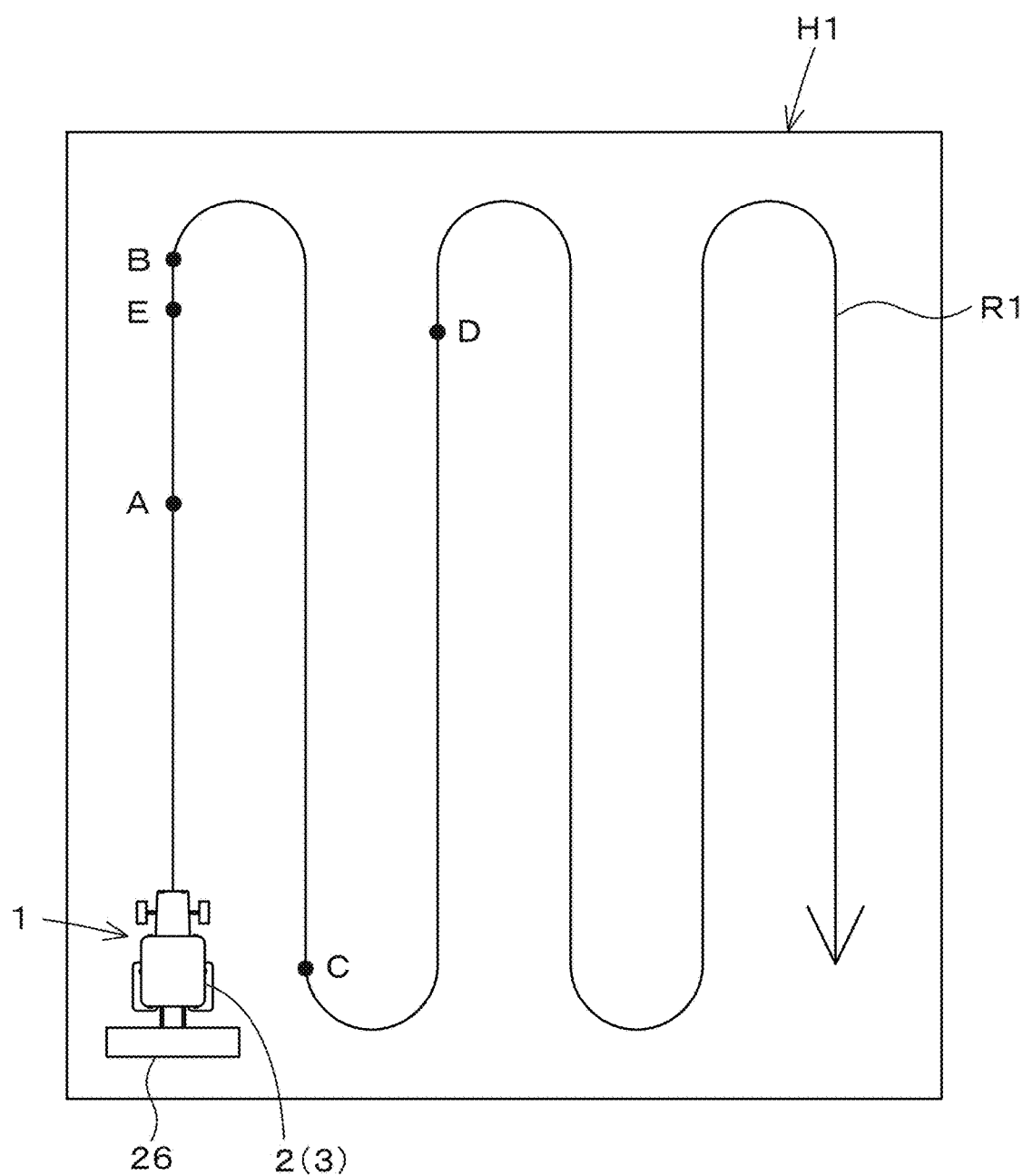
FIG. 5 is a view showing an example of a target traveling route determined in an agricultural field.

The autonomous traveling controller 15c outputs control signals to the traveling controller 15a and the autonomous steering device 23 based on positioning results by the positioning device 22, a target traveling route preliminarily determined, and the like. The target traveling route is, for example, provided by converting a traveling route of preliminary manual driving into data based on positioning results by the positioning device 22, and is stored in a storage of the controller 15. FIG. 5 is a view showing an example of a target traveling route R1 determined in an agricultural field H1.

Based on the control signals from the autonomous traveling controller 15c, the traveling controller 15a controls operations of devices of the traveling system such as the transmission device and a brake controller 29, and the autonomous steering device 23 steers the left and right front wheels 4F. The autonomous traveling controller 15c controls a traveling speed (that is, a vehicle speed) of the tractor 1 (that is, the traveling body 2) by changing the gear shifts of the transmission device, and controls a traveling direction of the tractor 1 (that is, the traveling body 2) by steering the left and right front wheels 4F. Specifically, the autonomous traveling controller 15c maintains a rotation angle of a rotation shaft of the steering motor when a deviation between a position of the vehicle body 3 and the target traveling route R1 is less than a threshold value in a state where the tractor 1 is autonomously traveling. When the deviation between the position of the vehicle body 3 and the target traveling route R1 is the threshold value or more and the tractor 1 is positioned leftward relative to the target traveling route R1, a rotation shaft of the steering motor is rotated so that a steering direction of the tractor 1 is orientated to the right. When the deviation between the position of the vehicle body 3 and the target traveling route R1 is the threshold value or more and the tractor 1 is positioned rightward relative to the target traveling route R1, the rotation shaft of the steering motor is rotated so that the steering direction of the tractor 1 is orientated to the left. A position on the target traveling route and a vehicle speed of the tractor 1 at the position are preliminarily determined and related to each other, and the autonomous traveling controller 15c controls the vehicle speed of the tractor 1 based on this relation. In this manner, the tractor 1 (that is, the traveling body 2) is capable of autonomously traveling on the target traveling route while controlling the traveling direction and the vehicle speed.

As shown in FIG. 4, the controller 15 is configured or programmed to include a traveling direction acquisition unit 15d, a working-trace direction acquisition unit 15e, and an illuminating pattern selector 15f. The traveling direction acquisition unit 15d, the working-trace direction acquisition unit 15e, and the illuminating pattern selector 15f each execute processing operations based on a predetermined control program stored in the storage.

The traveling direction acquisition unit 15d acquires a traveling direction of the tractor 1 based on a current position of the tractor 1 (that is, the traveling body 2) and the target traveling route R1 acquired by the positioning device 22. For example, in FIG. 5, when the tractor 1 is positioned at point A, the traveling direction acquisition unit 15d acquires "forward" as the traveling direction of the tractor 1. When the tractor 1 is positioned at point B, the traveling direction acquisition unit 15d acquires "rightward" as the traveling direction of the tractor 1. When the tractor 1 is positioned at point C, the traveling direction acquisition unit 15d acquires "leftward" as the traveling direction of the tractor 1.

The working-trace direction acquisition unit 15e acquires, as the working trace direction, a direction of a working trace (that is, a direction of the working trace relative to a current position of the vehicle body 3), which is a route on which the tractor 1 already traveled, based on a current position of the traveling body 2 and the target traveling route R1 acquired by the positioning device 22. The working traces are traces of workings performed by the ground working machine (for example, a rotary cultivator) attached to the attachment 5 of the vehicle body 3. For example, in FIG. 5, when the tractor 1 is positioned at point D, the working-trace direction acquisition unit 15e acquires "leftward" and "rearward" as the working-trace directions, which are routes on which the tractor 1 already traveled.

The illuminating pattern selector 15f selects a specific illuminating pattern from among a plurality of illuminating patterns of the illuminating lamps 17. The illuminating patterns and the illuminating pattern selector 15f will be described in detail later.

In addition, the tractor 1 includes a monitoring device 24.

As shown in FIG. 4, the monitoring device 24 includes the camera 20 and an image processing unit 25.

The camera 20 includes the plurality of cameras (that is, the first camera 20A, the second camera 20B, the third camera 20C, and the fourth camera 20D) described above. The image processing unit 25 processes video signals transmitted from the first camera 20A, the second camera 20B, the third camera 20C, and the fourth camera 20D to generate images, and displays the generated images on the display 14.

The display 14 is located around the driver seat 11 when the tractor 1 travels with an operator sitting on the driver seat (see FIG. 1), but when the working vehicle 1 travels without the operator sitting on the driver seat 11, a mobile terminal such as a smart phone (that is, a multi-function mobile phone) or a tablet terminal is used as the display 14. In this case, the display 14 is a mobile terminal that can be arranged at a position separate from the tractor 1 (that is, the traveling body 2). When the display 14 is a mobile terminal, the image processing unit 25 transmits the generated image to the display 14 by wireless communication, and then the display 14 displays the image. This allows an operator to view the images captured by the camera 20 through the mobile terminal (that is, the display 14) outside the tractor 1, and allows the operator to monitor (that is, to remotely monitor) autonomous traveling of the tractor 1 from a remote location.

As shown in FIG. 4, the controller 15 is configured or programmed to include an image quality estimating unit 15g configured to estimate an image quality of an image to be displayed on the display 14. The image quality estimating unit 15g estimates an image quality of an image to be displayed on the display 14 based on illuminance measured by the illuminance sensor 21. The image quality estimating unit 15g has an image quality estimation program stored in the storage of the controller 15, and estimates an image quality of an image to be displayed on the display 14 based on the program. The image quality estimating unit 15g may be included in the display 14 or the monitoring device 24.

When illuminance measured by the first illuminance sensor 21A is within a predetermined range and when a difference between illuminance measured by the first illuminance sensor 21A and illuminance measured by the second illuminance sensor 21B is within another predetermined range, the image quality estimating unit 15g estimates that an image quality of an image to be displayed on the display 14 is "good", which indicates that the image is suitable for recognizing a capturing object. In addition, when illuminance measured by the first illuminance sensor 21A is out of the predetermined range or when a difference between illuminance measured by the first illuminance sensor 21A and illuminance measured by the second illuminance sensor 21B is out of the predetermined range, the image quality estimating unit 15g estimates that an image quality of an image to be displayed on the display 14 is "poor", which indicates that the image is not suitable for recognizing a capturing object.

For example, when illuminance measured by the first illuminance sensor 21A is out of the predetermined range, the illuminance in the capturing direction of the camera 20 is too dark or too bright, and thus an image quality of the image captured by the camera 20 and displayed on the display 14 is "poor", which is an image unsuitable for recognizing a capturing object. Even when illuminance measured by the first illuminance sensor 21A is out of the predetermined range, the differences in brightness and darkness between the capturing direction and other directions is too large when a difference between illuminance measured by the first illuminance sensor 21A and illuminance measured by the second illuminance sensor 21B is out of the predetermined range, and thus an image quality of the image captured by the camera 20 and displayed on the display 14 is "poor", which is unsuitable for recognizing a capturing object.

Figure 3B:
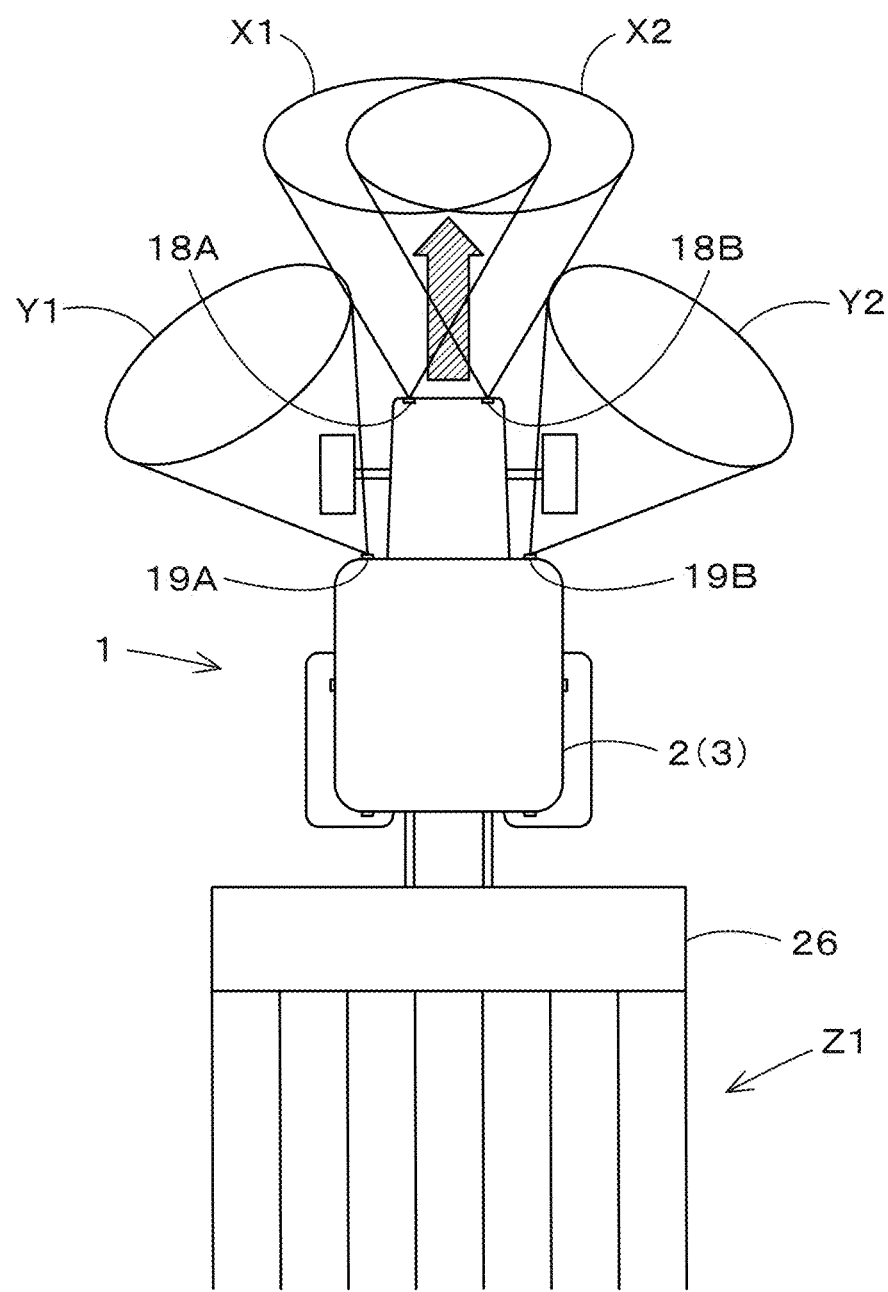
FIG. 3B is a plan view showing an example of the illuminating pattern of illumination lamp (a second illuminating pattern).
Figure 3C:
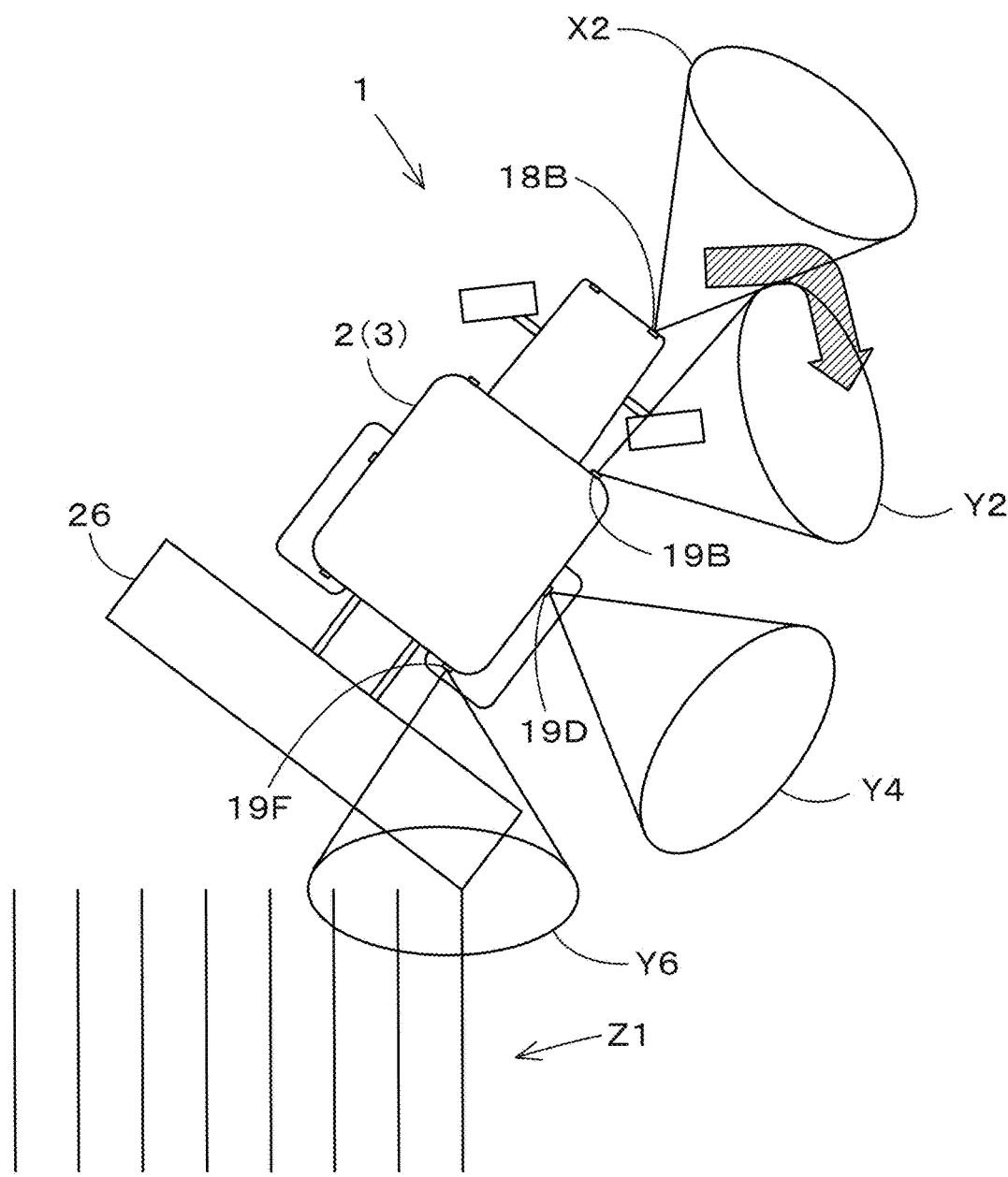
FIG. 3C is a plan view showing an example of the illuminating pattern of illumination lamp (a third illuminating pattern).
Figure 3D:
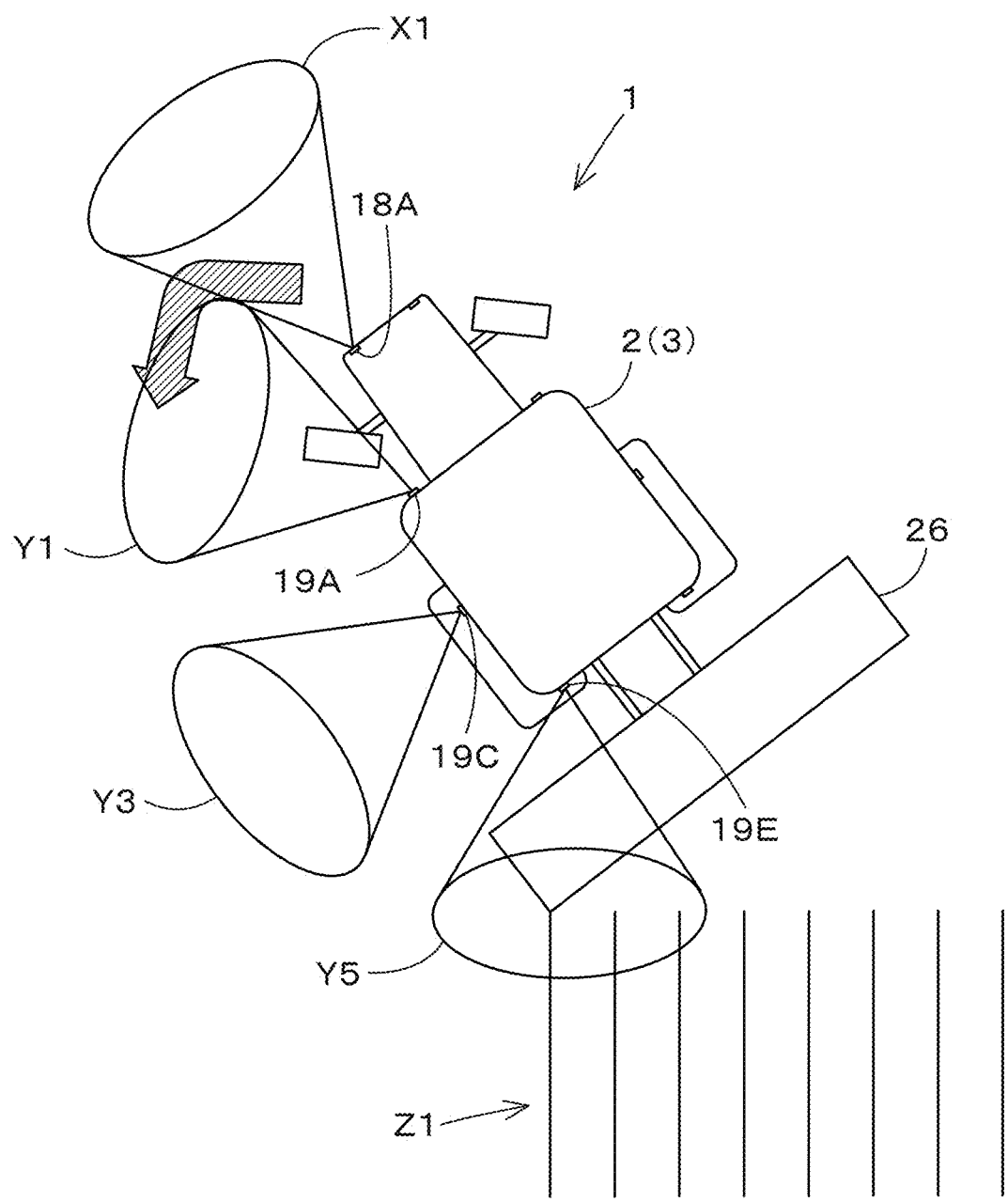
FIG. 3D is a plan view showing an example of the illuminating pattern of illumination lamp (a fourth illuminating pattern).
Figure 3E:
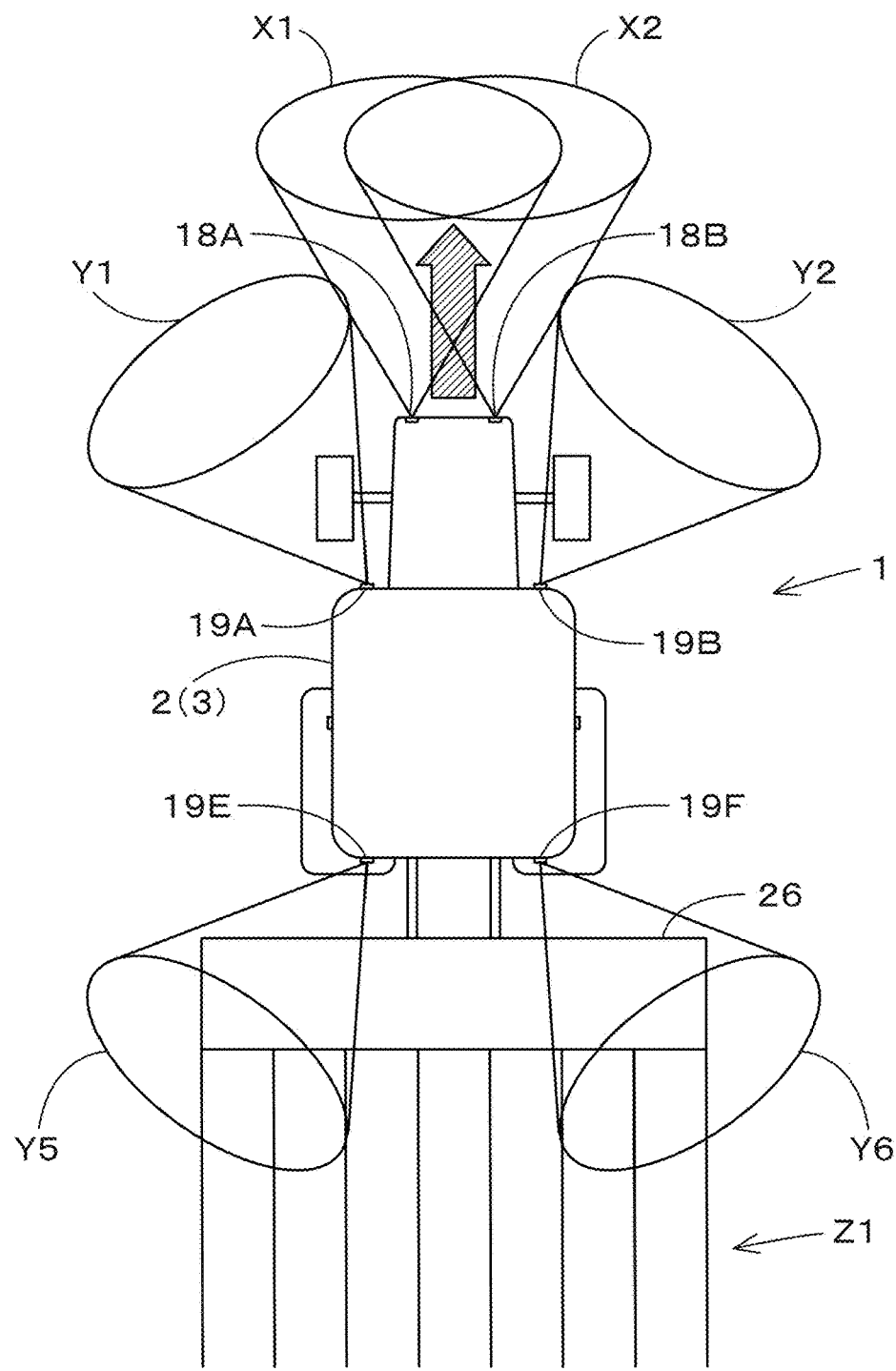
FIG. 3E is a plan view showing an example of the illuminating pattern of illumination lamp (a fifth illuminating pattern).
Figure 3F:
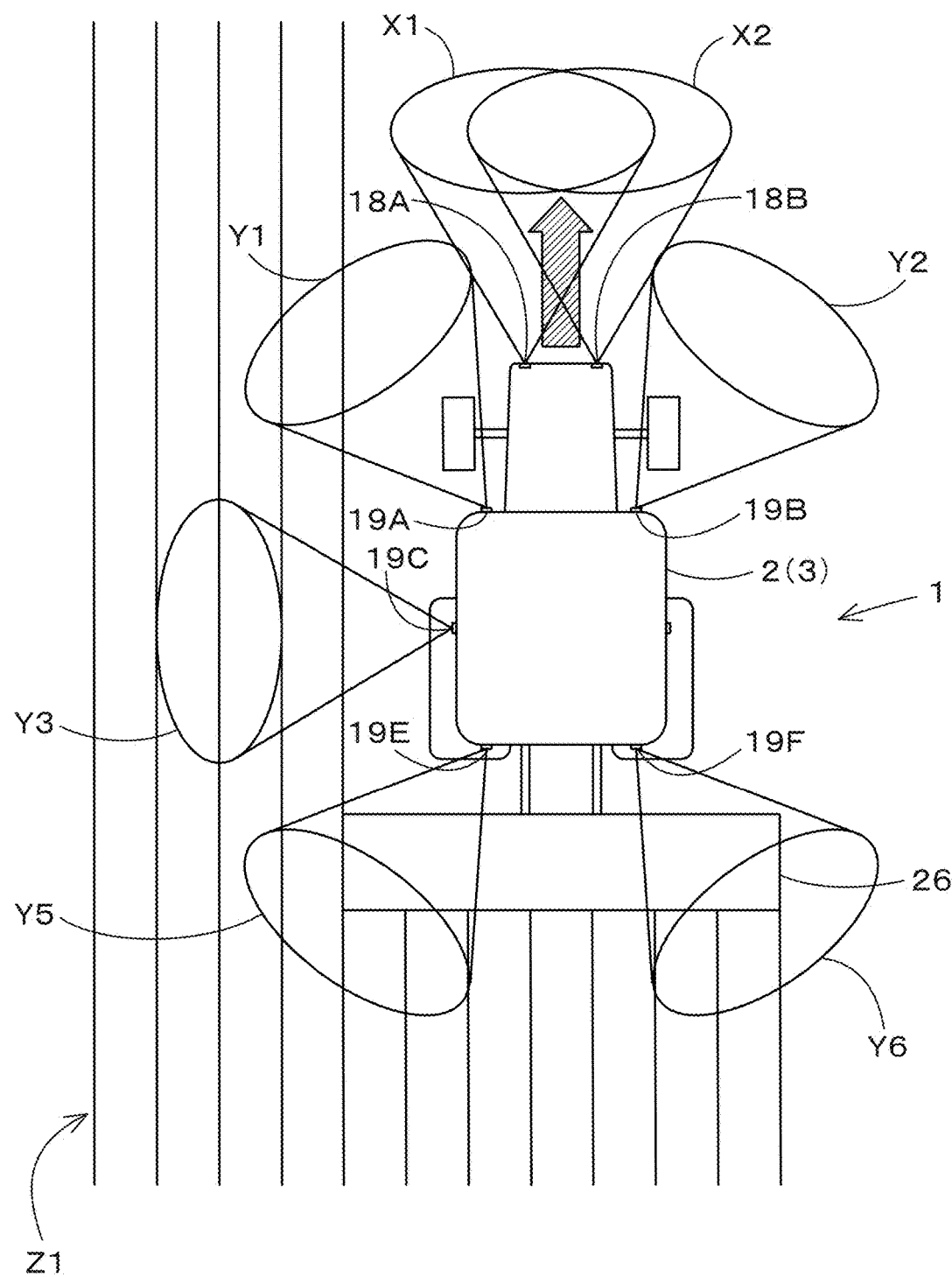
FIG. 3F is a plan view showing an example of the illuminating pattern of illumination lamp (a sixth illuminating pattern).
Figure 3G:
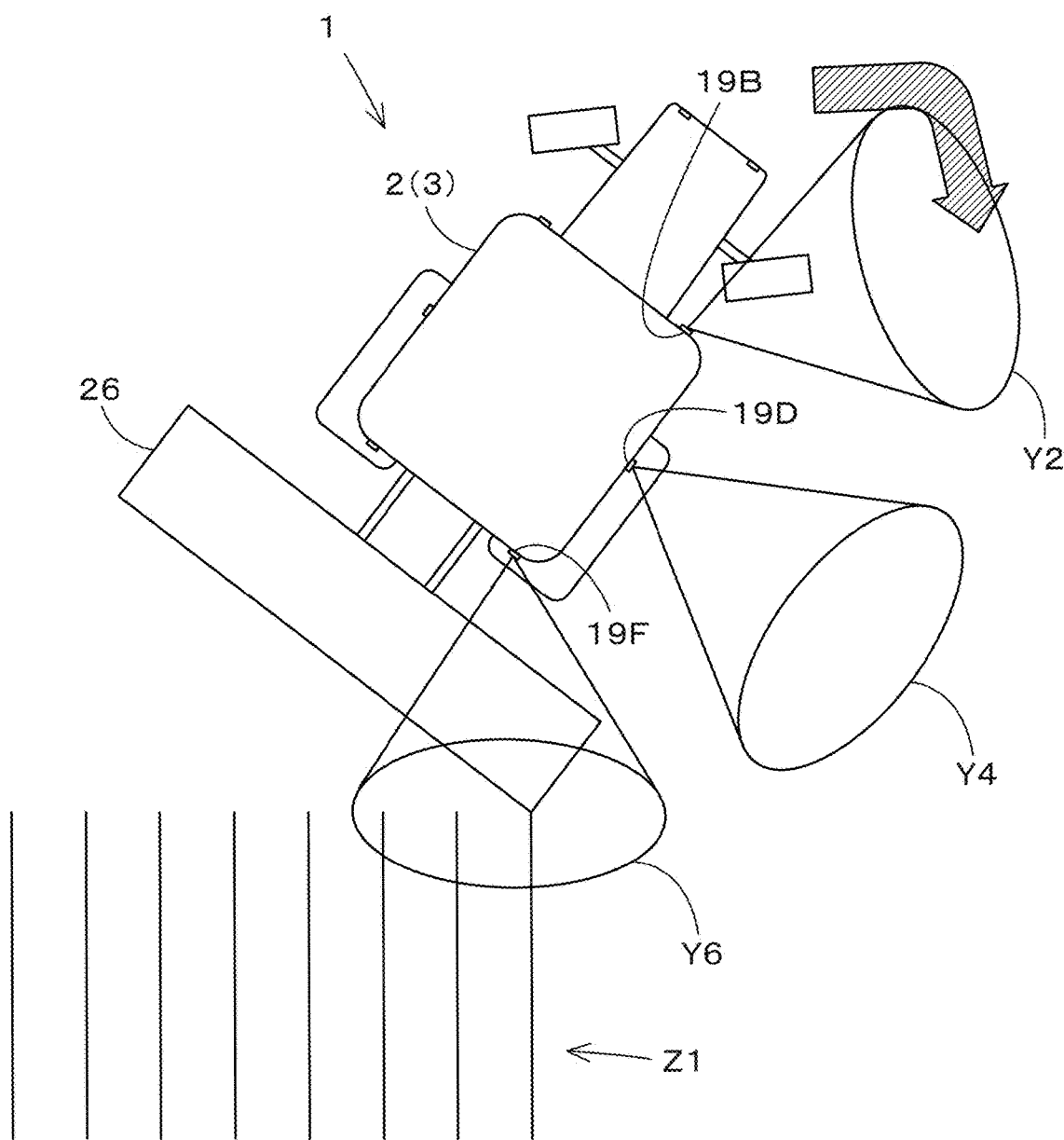
FIG. 3G is a plan view showing an example of the illuminating pattern of illumination lamp (a seventh illuminating pattern).
Figure 3H:
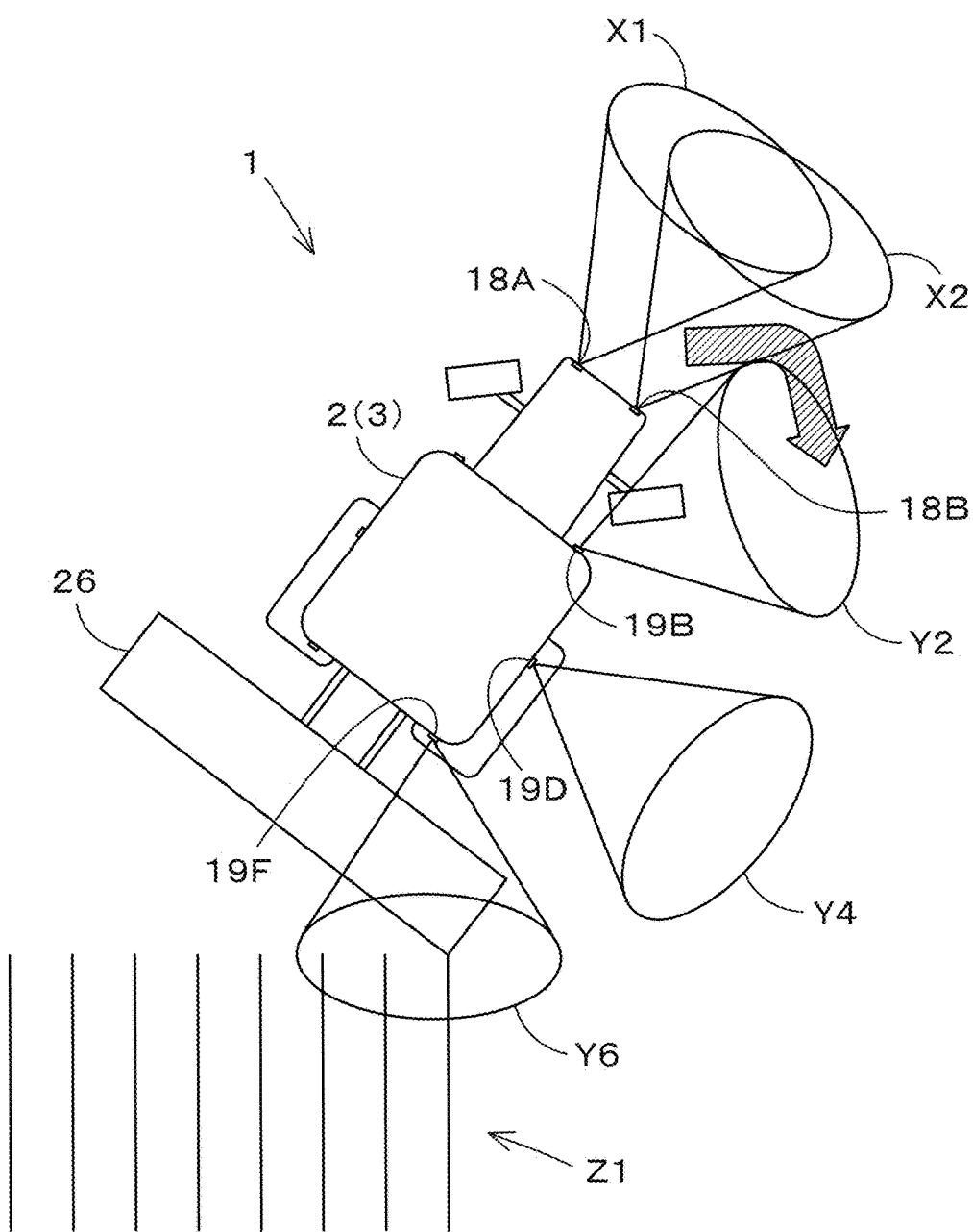
FIG. 3H is a plan view showing an example of the illuminating pattern of illumination lamp (an eighth illuminating pattern).

The storage of the controller 15 stores a plurality of illuminating patterns that define combinations of illuminating lamps to be lighted and illuminating lamps to be extinguished among the plurality of lighting lamps 17. FIGS. 3A to 3H are views showing examples of the illuminating patterns. For convenience of explanation, the illuminating pattern shown in FIG. 3A is called a first illuminating pattern, the illuminating pattern shown in FIG. 3B is called a second illuminating pattern, the illuminating pattern shown in FIG. 3C is called a third illuminating pattern, the illuminating pattern shown in FIG. 3D is called a fourth illuminating pattern, the illuminating pattern shown in FIG. 3E is called a fifth illuminating pattern, the illuminating pattern shown in FIG. 3F is called a sixth illuminating pattern, the illuminating pattern shown in FIG. 3G is called a seventh illuminating pattern, and the illuminating pattern shown in FIG. 3H is called an eighth illuminating pattern. However, the illuminating patterns shown in FIG. 3A to FIG. 3H are just examples of only a portion of the plurality of illuminating patterns stored in the storage.

In addition, in FIGS. 3B to 3H, a rectangle pointed by a reference numeral "26" indicates a ground working machine, and parallel longitudinal lines pointed by a reference sign "Z1" indicates working traces of the ground working machine 26. A relationship between the working traces Z1 of the ground working machine 26 and the illuminating patterns will be explained in detail later.

The first illuminating pattern shown in FIG. 3A is a pattern in which all of the plurality of lighting lamps 17 (that is, the head lamps 18 and the work lamps 19) are lighted. The second illuminating pattern shown in FIG. 3B is a pattern in which the first head lamp 18A, the second head lamp 18B, the first work lamp 19A, and the second work lamp 19B are lighted. The third illuminating pattern shown in FIG. 3C is a pattern in which the second head lamp 18B, the second work lamp 19B, the fourth work lamp 19D, and the sixth work lamp 19F are lighted. The fourth illuminating pattern shown in FIG. 3D is a pattern in which the first head lamp 18A, the first work lamp 19A, the third work lamp 19C, and the fifth work lamp 19E are lighted. The fifth illuminating pattern shown in FIG. 3E is a pattern in which the first head lamp 18A, the second head lamp 18B, the first work lamp 19A, the second work lamp 19B, the fifth work lamp 19E, and the sixth work lamp 19F are lighted. The sixth illuminating pattern shown in FIG. 3F is a pattern in which the first head lamp 18A, the second head lamp 18B, the first work lamp 19A, the second work lamp 19B, the third work lamp 19C, the fifth work lamp 19E, and the sixth work lamp 19F are lighted. The seventh illuminating pattern shown in FIG. 3G is a pattern in which the second work lamp 19B, the fourth work lamp 19D, and the sixth work lamp 19F are lighted. The eighth illuminating pattern shown in FIG. 3H is a pattern in which the first head lamp 18A, the second head lamp 18B, the second work lamp 19B, the fourth work lamp 19D, and the sixth work lamp 19F are lighted.

The storage of the controller 15 stores a plurality of illuminating patterns as an illuminating pattern table T1 (see FIG. 6). In FIG. 6, a circle mark indicates the lighting, and a cross mark indicates the extinguishing. The illuminating pattern table T1 shown in FIG. 6 is just an example of only a portion of the plurality of illuminating patterns.

In addition, the storage of the controller 15 stores a relation table T2 (see FIG. 7) that relates the illuminating patterns to the traveling direction of the tractor 1 (that is, the traveling body 2). The relation table T2 stores one-to-one relationship between "traveling directions" acquired by the traveling direction acquisition unit 15d and "illuminating patterns" stored in the illuminating pattern table T1. The relation table T2 shown in FIG. 7 is just an example of only some of the relationships between the traveling directions and the illuminating patterns.

The relationships between the "traveling directions" and the "illuminating patterns" are determined so that the illuminating lamps 17 to illuminate the traveling direction of the traveling body 2 are lighted. For example, when the traveling body 2 travels forward, the relationship is determined so that the illuminating lamps 17 (for example, the first head lamp 18A, the second head lamp 18B, and the like) to illuminate the front, which is the traveling direction, are lighted. When the traveling body 2 changes direction, the relationship is determined so that the illumination lamps 17 to illuminate a target direction to be set as a subsequent traveling direction after the changing direction are lighted. Specifically, when the traveling body 2 changes direction to the right (that is, turns right), the relationship is determined so that the illumination lamps 17 (for example, the fourth work lamp 19D and the like) to illuminate the right direction, which is the target direction to be set as a subsequent traveling direction after the changing direction, are lighted. When the traveling body 2 changes direction to the left (that is, turns left), the relationship is determined so that the illumination lamps 17 (for example, the third work lamp 19C and the like) to illuminate the left direction, which is the target direction to be set as a subsequent traveling direction after the changing direction, are lighted.

Figure 7:
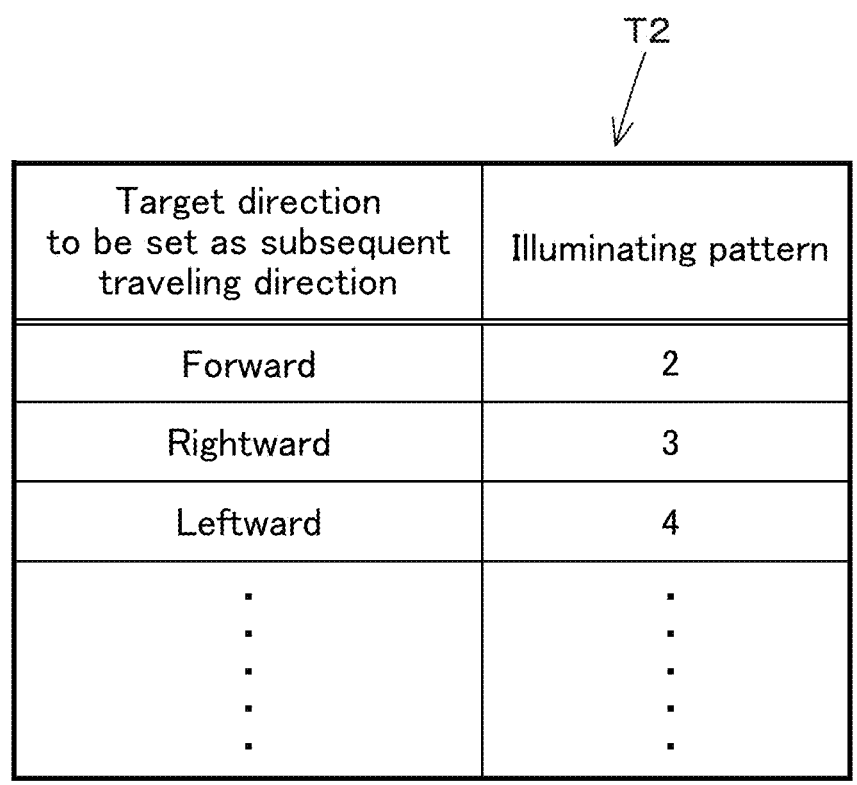
FIG. 7 is a view showing an example of a relation table.

In the relation table T2 shown in FIG. 7, the "forward" of the traveling direction is related to the "second illuminating pattern" (see FIG. 3B) in which the illuminating lamps 17 to illuminate the front that is a traveling direction of the traveling body 2 are lighted. The "rightward" of the traveling direction is related to the "third illuminating pattern" (see FIG. 3C) in which the illuminating lamps 17 to illuminate the right that is a traveling direction of the traveling body 2 are lighted. The "leftward" of the traveling direction is related to the "fourth illuminating pattern" (see FIG. 3D) in which the illuminating lamps 17 to illuminate the left that is a traveling direction of the traveling body 2 are lighted.

Before the traveling body 2 changes direction, the controller 15 selectively lights at least one of the illumination lamps based on a target traveling route so that the selectively lighted at least one illumination lamp illuminates a target direction to be set as a subsequent traveling direction after the changing direction among the plurality of illumination lamps 17. Specifically, the illuminating pattern selector 15f of the controller 15 selects one of the illuminating patterns stored in the storage so as to illuminate a target direction to be set as a subsequent traveling direction for the traveling body 2 after the changing direction.

For example, in a state where the traveling body 2 is traveling on the target traveling route R1 shown in FIG. 5, a traveling direction detected by the traveling direction acquisition unit 15d is "forward" when the traveling body 2 positions at the point A, and then the illuminating pattern selector 15f selects, from the relation table T2, the "second illuminating pattern" to be selected when the traveling direction is "forward. When the traveling body 2 positions at the point B, the traveling direction acquired by the traveling direction acquisition unit 15d is "rightward," and then the illuminating pattern selector 15f selects, from the relation table T2, the "third illuminating pattern" to be selected when the traveling direction is "rightward". When the traveling body 2 positions at the point C, the traveling direction acquired by the traveling direction acquisition unit 15d is "leftward," and then the illuminating pattern selector 15f selects, from the relation table T2, the "fourth illuminating pattern" to be selected when the traveling direction is "leftward".

In the traveling body 2 that is changing direction, when the traveling body 2 reaches a turning point, the illuminating pattern may be selected by the illuminating pattern selector 15f, and the illuminating lamps 17 may be lighted based on the selection. For example, in a case where the traveling body 2 is traveling on the target traveling route R1 shown in FIG. 5, the illuminating pattern may be selected by the illuminating pattern selector 15f at the point B or C, and further the illuminating lamps 17 may be lighted based on the selection at the point B or C.

In the traveling body 2 that is changing direction, before the traveling body 2 reaches the turning, the illuminating pattern may be selected by the illuminating pattern selector 15f, and the illuminating lamps 17 may be lighted based on the selection. In this case, a point behind the turning point by a predetermined distance (for example, 1 meter) in the traveling direction is determined as a "specific point," and at the specific point, the illuminating pattern is selected by the illuminating pattern selector 15f, and the illuminating lamps 17 is lighted based on the selection. For example, in a state where the traveling body 2 travels on the target traveling route shown in FIG. 5, point E behind the point B that is the turning point by a predetermined distance in the traveling direction is determined as the specific point, and the illuminating pattern is selected at the point E, and the illuminating lamps 17 are lighted based on this selection.

When the illuminating pattern selector 15f selects one of the illuminating patterns, the illuminating lamps 17 to be lighted are lighted according to the selected illuminating pattern and the illuminating lamps 17 to be extinguished are extinguished according to the selected illuminating pattern, based on the illuminating pattern table T1. For example, when the illuminating pattern selector 15*f* selects the "second illuminating pattern", the first head lamp 18A, the second head lamp 18B, the first work lamp 19A, and the second work lamp 19B are lighted, and the other illuminating lamps are extinguished, as shown in FIG. 3B. When the illuminating pattern selector 15*f* selects the "third illuminating pattern 3", the second head lamp 18B, the second work lamp 19B, the fourth work lamp 19D, and the sixth work lamp 19F are lighted, and the other illuminating lamps are extinguished, as shown in FIG. 3C. When the illuminating pattern selector 15*f* selects the "fourth illuminating pattern", the first head lamp 18A, the first work lamp 19A, the third work lamp 19C, and the fifth work lamp 19E are lighted, and the other illuminating lamps are turned off, as shown in FIG. 3D.

In this manner, when the traveling body 2 is traveling forward (that is, straight ahead) (when positioning at the point A), the illuminating lamps 17 to illuminate an area in front of the traveling body 2 can be lighted. When the traveling body 2 is turning right (when positioning at the point B), the illuminating lamps 17 to illuminate a right area beside the traveling body 2 can be lighted. In addition, when the traveling body 2 is turning left (when positioning at the point C), the illuminating lamps 17 to illuminate a left area beside the traveling body 2 can be lighted. Thus, before the traveling body 2 changes direction, the illuminating lamps 17 to illuminate a target direction to be set as a subsequent traveling direction after the changing direction can be lighted selectively from among the plurality of illuminating lamps 17.

According to this configuration, in a state where the tractor 1 changes direction, the illuminating lamps 17 can illuminate a traveling direction of the tractor 1 before the changing direction. Accordingly, the operator can reliably confirm the presence or absence of obstacles in the traveling direction of the tractor 1.

The illuminating pattern selector 15*f* may be configured to select an illuminating pattern so that the image quality estimated by the image quality estimating unit 15*g* satisfies a predetermined condition that provides an image quality suitable for recognizing a capturing object. In this configuration, the illuminating pattern selector 15*f* selects, based on a target traveling route, an illuminating pattern in which a traveling direction of the traveling body 2 after the changing direction is illuminated from among the illuminating patterns stored in the storage, so that an image quality estimated by the image quality estimating unit 15*g* satisfies a predetermined condition that provides an image quality suitable for recognizing a capturing object.

In the present preferred embodiment, the predetermined condition is described as follows; "an illuminance measured by the first illuminance sensor 21A is within a predetermined range, and a difference between the illuminance measured by the first illuminance sensor 21A and illuminance measured by the second illuminance sensor 21B is within another predetermined range". As described above, when this condition is satisfied, an image quality of image to be displayed on the display 14 is estimated to be "good", which represents that the image is suitable for recognizing a capturing object.

Figure 8:
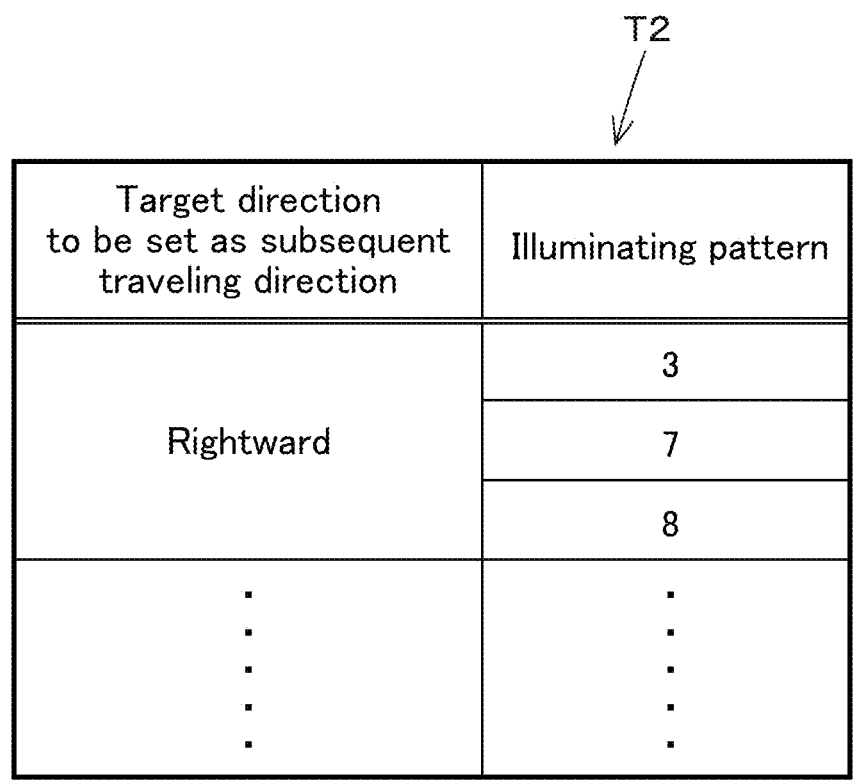
FIG. 8 is a view showing another example of the relation table.

When adopting this configuration, a plurality of "illuminating patterns" are related to one "traveling direction" in the relation table T2, as shown in FIG. 8. In the example shown in FIG. 8, three illuminating patterns (that is, the third illuminating pattern, the seventh illuminating pattern, and the eighth illuminating pattern) are related to "rightward" of the traveling direction. The three illuminating patterns respectively provide different illuminances in the traveling direction; the eighth illuminating pattern provides the brightest illuminance (see FIG. 3H), the third illuminating pattern provides the brighter illuminance (see FIG. 3C), and the seventh illuminating pattern provides a basic illuminance (see FIG. 3G), in order of illuminance (brightness).

The illuminating pattern selector 15*f* selects one of the illuminating patterns that satisfies the above-mentioned predetermined condition from among the plurality of "illuminating patterns" related to one "traveling direction". For example, an illuminating pattern that satisfies the above-mentioned predetermined condition is selected from among three illuminating patterns (that is, the illuminating pattern 7, the illuminating pattern 3, and the illuminating pattern 8) relative to "rightward" of the traveling direction. For example, when illuminance in a capturing direction is insufficient in the seventh illuminating pattern and when a brightness difference between the capturing direction and other directions is too large in the eighth illuminating pattern, the third illuminating pattern is selected. In this case, the second head lamp 18B, the second work lamp 19B, the fourth work lamp 19D, and the sixth work lamp 19F are lighted, and the other lamps are extinguished, as shown in FIG. 3C.

According to this configuration, the illuminating lamps 17 can illuminate a traveling direction of the tractor 1, and an image captured by the camera 20 and displayed on the display 14 can be suitable for recognizing a capturing object. Thus, an operator can reliably confirm the presence or absence of obstacles in the traveling direction of the tractor 1.

In this configuration, in order to make the image captured by the camera 20 and displayed on the display 14 for recognizing a capturing object, the controller 15 may be configured or programmed to control illuminances (brightness) and/or illuminating directions of the illumination lamps 17 (that is, the head lamps 18 and the work lamps 19) to be changed.

The illuminating pattern selector 15*f* may be configured or programmed to select an illuminating pattern so as to illuminate a working trace Z1 of the ground working machine 26 attached to the attachment 5 of the tractor 1. The working trace Z1 is, for example, a cultivating trace when the ground working machine 26 is a rotary cultivator, and a mowing trace when the ground working machine 26 is a mower. In this case, the illuminating pattern selector 15*f* selects, based on a target traveling route, an illuminating pattern in which a traveling direction of the traveling body 2 after the changing direction is illuminated from among the illuminating patterns stored in the storage, so that an image quality estimated by the image quality estimating unit 15*g* satisfies a predetermined condition that provides an image quality suitable for recognizing a capturing object and the working traces Z1 is illuminated.

To adopt this configuration, an "illuminating pattern" is related to a combination of a "traveling direction" and a "working trace direction " in the relation table T2, as shown in FIG. 9. In an example shown in FIG. 9, the fifth illuminating pattern (see FIG. 3E) is related as the "illuminating pattern" to a combination of "forward" of the traveling direction and "rearward" of the working-trace direction. In addition, the sixth illuminating pattern (see FIG. 3F) is related as the "illuminating pattern" to a combination of "forward" of the traveling direction and "leftward and rearward" of the working-trace direction.

For example, when the traveling body 2 is located at the point D in FIG. 5, the illuminating pattern selector 15f selects, from the relation table T2, the "sixth illuminating pattern" (see FIG. 3F) that is an illuminating pattern for the combination of "forward" of the traveling direction and "leftward and rearward" of the working-trace direction since a traveling direction acquired by the traveling direction acquisition unit 15d is "forward" and the working-trace direction acquired by the working-trace direction acquisition unit 15e is "leftward" and "rearward".

According to this configuration, both the traveling direction of the tractor 1 (forward) and the direction of the working traces Z1 (leftward and rearward) are illuminated by the illumination lamps 17 and captured by the camera 20, and the captured images can be confirmed on the display 14. Thus, an operator can confirm whether a work by the ground working machine 26 is being performed well or not, in addition to the presence or absence of obstacles in the traveling direction of the tractor 1.

As shown in FIG. 4, the controller 15 is configured or programmed to include a grading unit 15h configured or programmed to grade clearness of the images captured by the camera 20. In autonomous traveling of the tractor 1 (that is, the traveling body 2), the controller 15 changes a control relating to a way of lighting of the illumination lamps 17 based on the clearness graded by the grading unit 15h. The grading unit 15h has a grading program stored in the storage of the controller 15, and grades the clearness of the image captured by the camera 20 based on the program. The display 14 or the monitoring device 24 may include the grading unit 15h.

The grading unit 15h grades the clearness of the image based on a predetermined index. For example, luminance (lightness or brightness) and contrast are used as the index of clearness. In this case, the grading unit 15h grades the clearness of image based on the luminance and contrast of the image. In the grading based on the luminance of the image, the luminance of the overall image is judged whether to be within a predetermined proper range (hereinafter referred to as a "first proper range").

In the grading based on the contrast, it is judged whether a difference in luminance between the brightest area and the darkest area of the image is within a predetermined proper range (hereinafter referred to as a "second proper range"). Specifically, a plurality of areas, for example, are defined in the image, and it is judged whether the difference in luminance between the brightest area and the darkest area is within the second proper range.

The grading unit 15h grades the clearness of image as "good" when determining that both the luminance and contrast of the image are within the proper range, and grades the clearness of the image as "poor" when determining that at least one of them is out of the proper range. When the clearness of the image is "good," the image captured by the camera 20 and displayed on the display 14 (hereinafter referred to as a "captured image G1") is a suitable image for recognizing a capturing object.

FIGS. 10A to 10G show examples of captured images G1 captured by the first camera 20A and displayed on the screen M1 of the display 14. The camera whose images are graded by the grading unit 15h is not limited to the first camera 20A, but may be the second camera 20B, the third camera 20C, or the fourth camera 20D. In FIGS. 10A to 10G, the shaded areas are the relatively dark areas in the overall image, and the areas drawn by dashed lines are the relatively bright areas in the overall image.

Three areas (that is, a first area F1, a second area F2, and a third area F3) are defined in the captured image G1. The first area F1 is a left area of the captured image G1. The second area F2 is a right area of the captured image G1. The third area F3 is a center area of the captured image G1. That is, the captured image G1 is divided into a plurality (three) of areas aligned in the vehicle width direction. A virtual line L1 indicates a boundary between the first area F1 and the third area F3, and a virtual line L2 indicates a boundary between the second area F2 and the third area F3. However, the number of and positions of the areas defined in the captured image G1 are not limited to these examples, and can be changed appropriately.

Figure 10A:
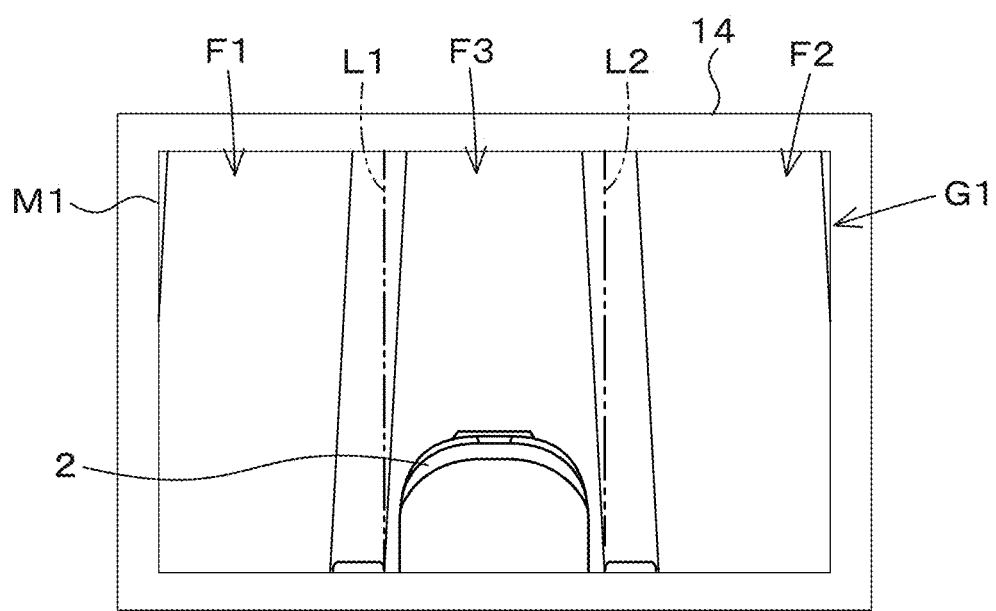
FIG. 10A is a view showing an example of a captured image displayed on a screen of a display.

FIG. 10A shows the captured image G1 of the case where the luminance of the overall image is within a predetermined proper range (hereinafter referred to as the "first proper range") and the difference in luminance between the brightest area and the darkest area is within a predetermined proper range (hereinafter referred to as the "second proper range"). That is, in the captured image G1, the luminance of the overall image is within the first proper range. In addition, the difference in brightness between the brightest area (for example, the first area F1) and the darkest area (for example, the second area F2) is small and within the second proper range. In this case, the grading unit 15h grades the clearness of the image as "good" since both the luminance and contrast of the image are within the proper ranges. The captured image G1 displayed on the display 14 is a suitable image for recognizing a capturing object, and the controller 15 does not change the control relating to a way of lighting of the illumination lamps 17.

Figure 10B:
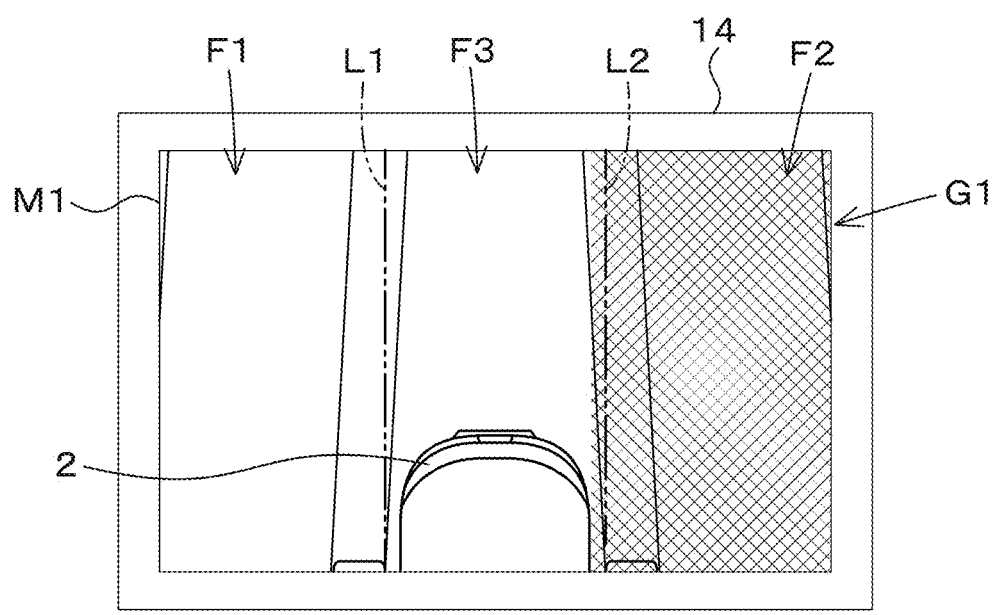
FIG. 10B is a view showing an example of a captured image displayed on the screen of the display.

In the captured image G1 shown in FIG. 10B, the luminance of the overall image is within the first proper range, but the second area F2 is darker than other areas (the first area F1 and the third area F3), and a difference in brightness between the darkest second area F2 and the brightest area (for example, the first area F1) is out of the second proper range. In this case, the grading unit 15h grades the clearness of the image as "poor (insufficient luminance in right portion)" because the contrast of the image is out of the proper range due to the darkness of the second area (the right portion). In this case, the captured image G1 displayed on the display 14 is an image unsuitable for recognizing a capturing object because the right portion is too dark, and the controller 15 changes the control relating a way of lighting of the illumination lamps 17 as described below.

Figure 10C:
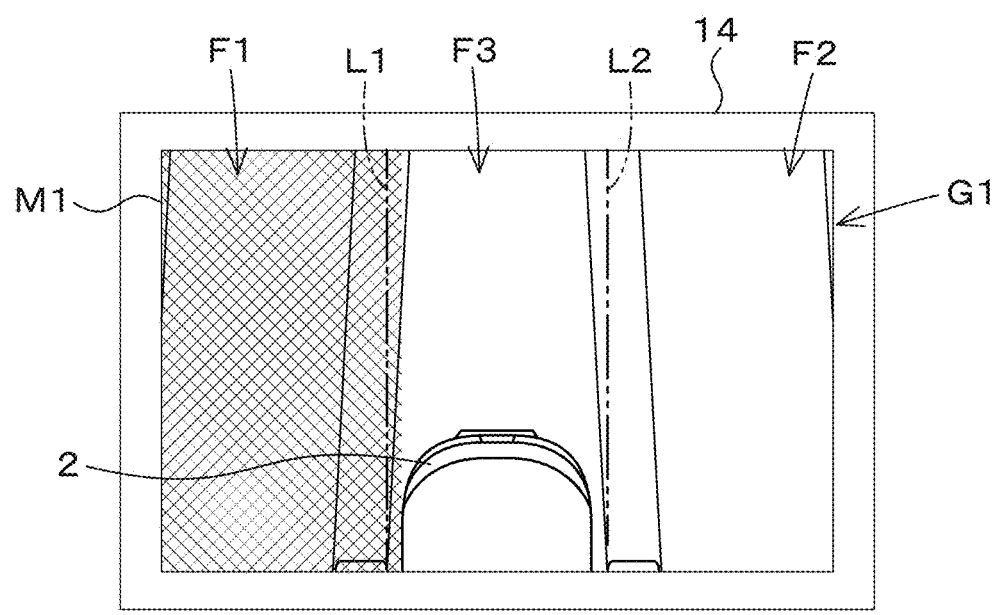
FIG. 10C is a view showing an example of a captured image displayed on the screen of the display.

In the captured image G1 shown in FIG. 10C, the luminance of the overall image is within the first proper range, but the first area F1 is darker than other areas (that is, the second area F2 and the third area F3), and the difference in brightness between the darkest first area F1 and the brightest area (for example, the second area F2) is out of the second proper range. In this case, the grading unit 15h grades the clearness of the image as "poor (insufficient brightness in left portion)" because the contrast of the image is out of the proper range due to the darkness of the second area (the left portion). In this case, the captured image G1 displayed on the display 14 is an image unsuitable for recognizing a capturing object because the left portion is too dark, and the controller 15 changes the control relating a way of lighting of the illumination lamps 17 as described below.

Figure 10D:
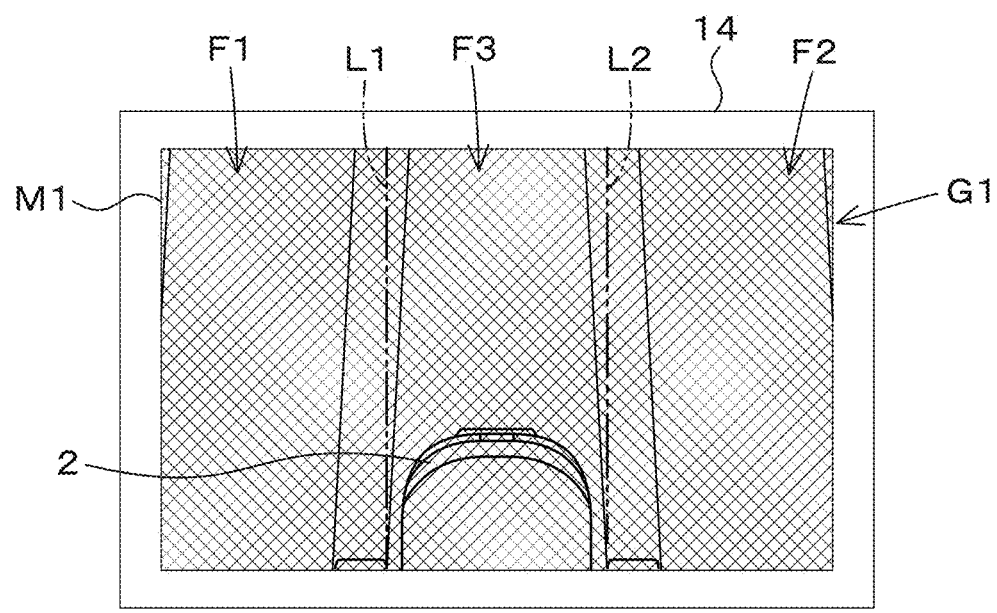
FIG. 10D is a view showing an example of a captured image displayed on the screen of the display.

In the captured image G1 shown in FIG. 10D, the overall image is too dark, but is within the second proper range because the difference in brightness between the brightest area and darkest areas is within the second proper range; however, the luminance of the overall image is out of the first proper range. In this case, the grading unit 15h grades the clearness of the image as "poor (insufficient luminance in overall)" because the luminance of the overall image is out of the proper range. In this case, the captured image G1 displayed on the display 14 is an image unsuitable for recognizing a capturing object because the overall image is too dark, and the controller 15 changes the control relating to a way of lighting of the illumination lamps 17 as described below.

Figure 10E:
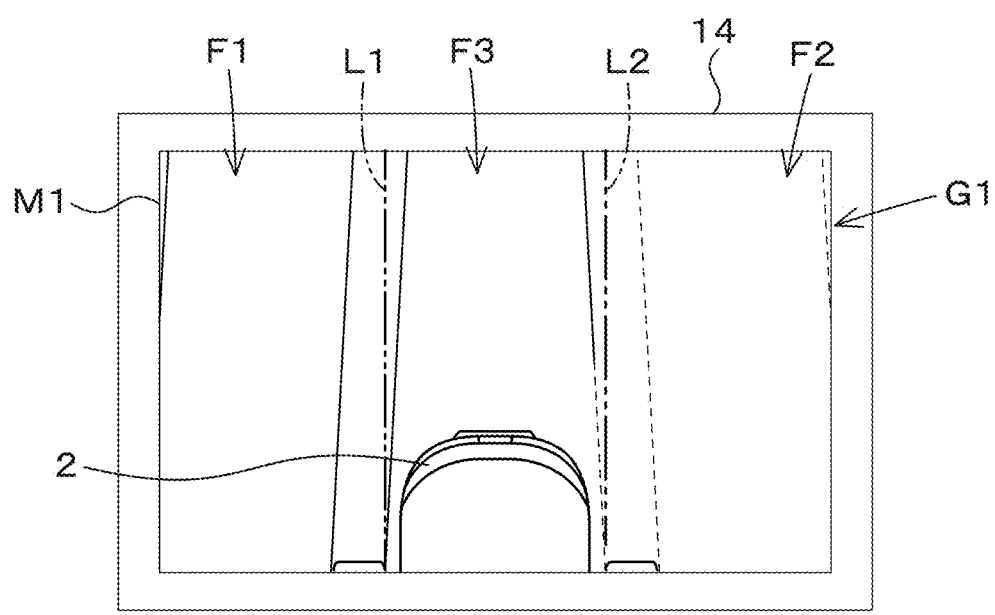
FIG. 10E is a view showing an example of a captured image displayed on the screen of the display.

In the captured image G1 shown in FIG. 10E, the luminance of the overall image is within the first proper range, but the second area F2 is brighter than the other areas (for example, the first area F1 and the third area F3), and the difference in brightness between the brightest second area F2 and the darkest area (for example, the first area F1) is out of the second proper range. In this case, the grading unit 15h grades the clearness of the image as "poor (excessive luminance in right portion)" because the contrast of the image is out of the proper range due to the luminance of the second area (the right portion). In this case, the captured image G1 displayed on the display 14 is an image unsuitable for recognizing a capturing object because the right portion is too bright, and the controller 15 changes the control relating to a way of lighting of the illumination lamps 17 as described below.

Figure 10F:
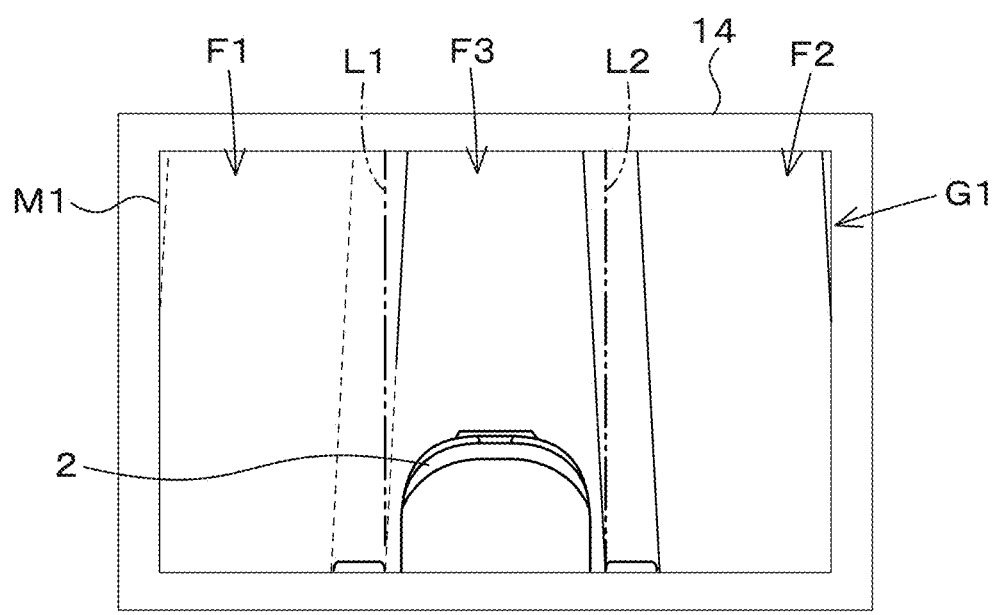
FIG. 10F is a view showing an example of a captured image displayed on the screen of the display.

In the captured image G1 shown in FIG. 10F, the luminance of the overall image is within the first proper range, but the first area F1 is brighter than other areas (the second area F2 and the third area F3), and the difference in brightness between the brightest first area F1 and the darkest area (for example, the second area F2) is out of the second proper range. In this case, the grading unit 15h grades the clearness of the image as "poor (excessive luminance in left portion)" because the contrast of the image is out of the proper range due to the luminance of the first area (the left portion). In this case, the captured image G1 displayed on the display 14 is an image unsuitable for recognizing a capturing object because the left portion is too bright, and the controller 15 changes the control relating to a way of lighting of the illumination lamps 17 as described below.

Figure 10G:
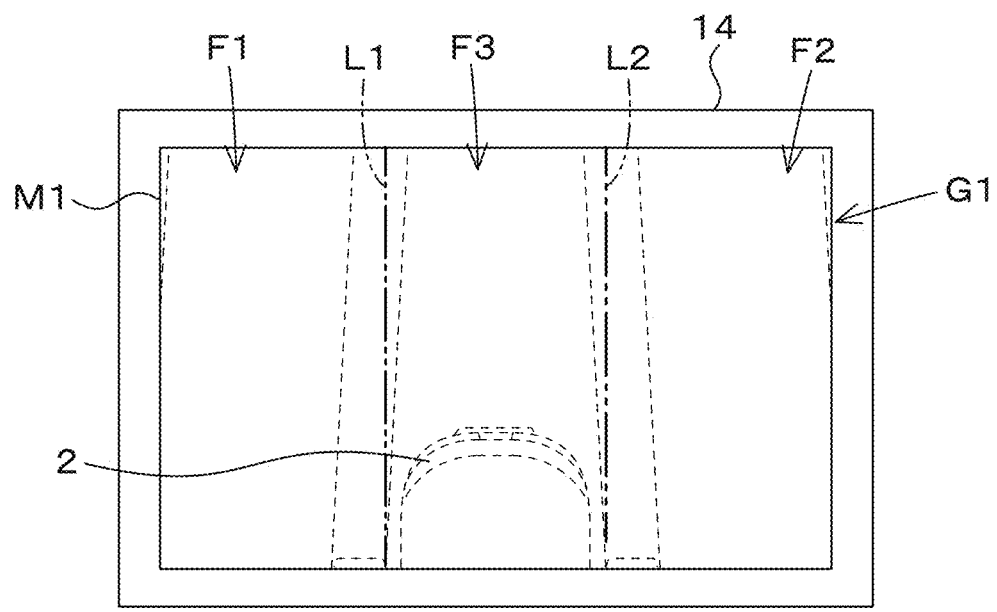
FIG. 10G is a view showing an example of a captured image displayed on the screen of the display.

In the captured image G1 shown in FIG. 10G, the overall image is too bright, and the difference in brightness between the brightest area and the darkest areas is small and thus within the second proper range; however, the luminance of the overall image is out of the first proper range. In this case, the grading unit 15h grades the clearness of the image as "poor (excessive luminance in overall)" because the luminance of the image is out of the proper range. In this case, the captured image G1 displayed on the display 14 is an image unsuitable for recognizing a capturing object because the overall image is too bright, and the controller changes the control relating to a way of lighting of the illumination lamps 17 as described below.

Based on the clearness graded by the grading unit 15f, the controller 15 changes the control relating to a way of lighting of the illumination lamps 17 during autonomous traveling. Specifically, one or more of the illumination lamps 17 that illuminate a capturing direction of the camera 20 are selectively lighted, or illuminances of the illumination lamps 17 that illuminate the capturing direction of the camera 20 is changed.

The following is an explanation with specific examples.

Figure 11A:
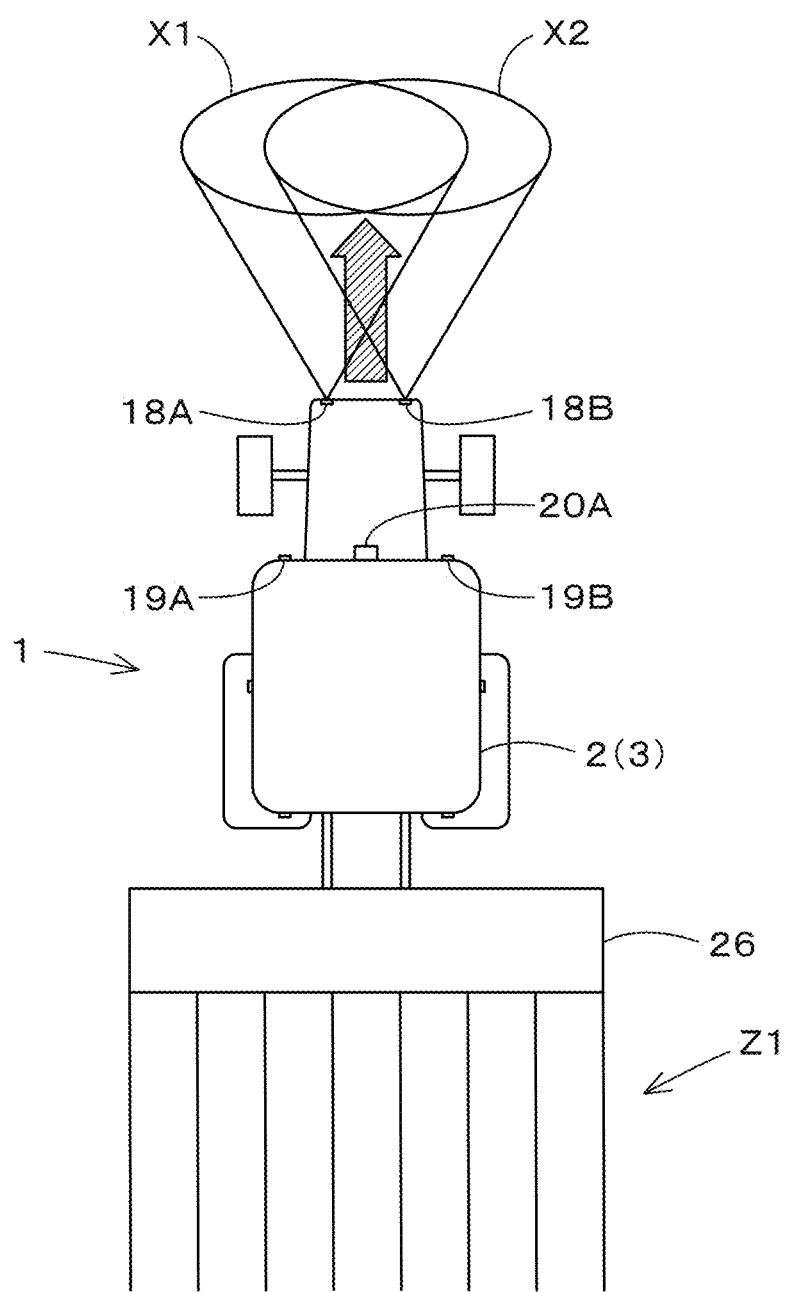
FIG. 11A is an explanation view of changing a control relating to a way of lighting illumination lamps by a controller.

When a captured image is the image shown in FIG. 10A in a state where the traveling body 2 is autonomously traveling forward with the illuminating pattern that is shown in FIG. 11A, the grading unit 15h grades the clearness of the image to be "good". In this case, the controller 15 does not make any changes relating to a way of lighting of the illumination lamps 17 based on this grading. That is, among the plurality of lighting lamps 17, the illuminating lamps 17 presently lighted are kept on as they are in an illuminating state (without any change in illuminance), and the illuminating lamps 17 presently extinguished are kept in an extinguished state. Thus, the traveling body 2 continues to travel autonomously with the illuminating pattern shown in FIG. 11A maintained.

Figure 11B:
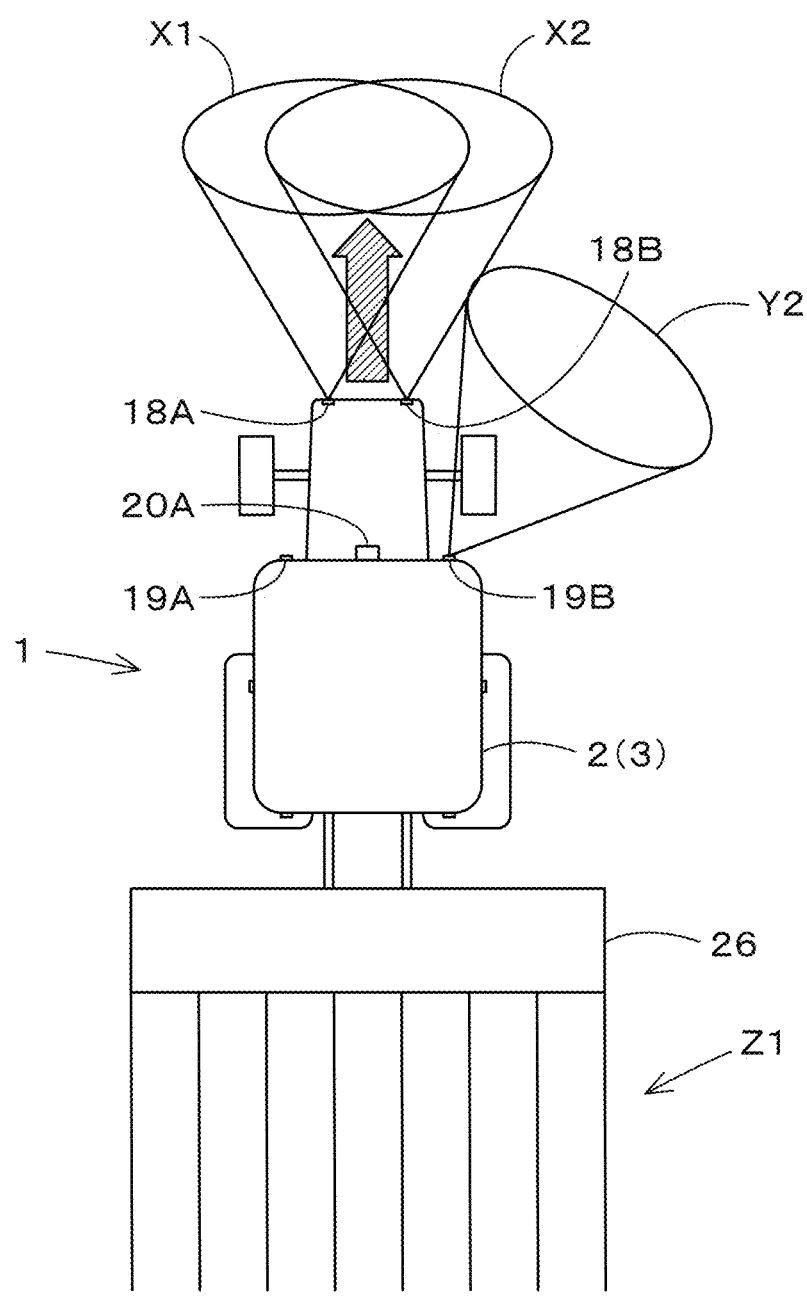
FIG. 11B is an explanation view of changing the control relating to the way of lighting the illumination lamps by the controller.

When a captured image is the image shown in FIG. 10B in a state where the traveling body 2 is autonomously traveling forward with the illuminating pattern that is shown in FIG. 11A, the grading unit 15h grades the clearness of the image as "poor (insufficient luminance in right portion)". The controller 15 changes the control relating to a way of lighting of the illumination lamps 17 based on this grading. Specifically, the controller 15 changes the illuminating lamp (for example, the second working light 19B) for illuminating an insufficient luminance direction from the extinguishing state to the illuminating state (see FIG. 11B) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamp (for example, the second head lamp 18B) illuminating an insufficient luminance direction so that the direction becomes more luminant. In this manner, the right portion of the captured image becomes luminant, resulting in an image with the proper clearness shown in FIG. 10A.

Figure 11C:
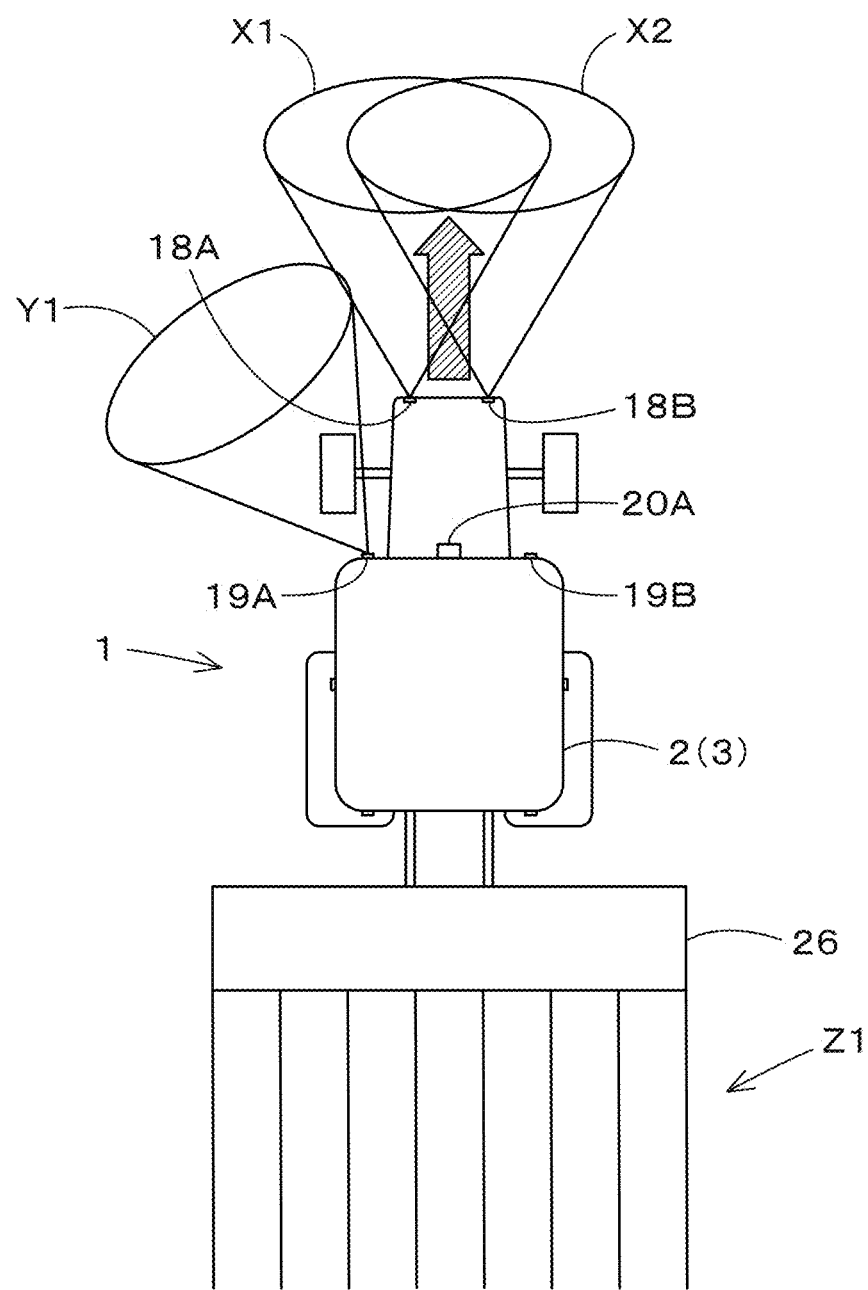
FIG. 11C is an explanation view of changing the control relating to the way of lighting the illumination lamps by the controller.

When a captured image is the image shown in FIG. 10C in a state where the traveling body 2 is autonomously traveling forward with the illuminating pattern that is shown in FIG. 11A, the grading unit 15h grades the clearness of the image as "poor (insufficient luminance in left portion)". The controller 15 changes the control relating to a way of lighting of the illumination lamps 17 based on this grading. Specifically, the controller 15 changes the illuminating lamp (for example, the first work lamp 19A) for illuminating an insufficient luminance direction from the extinguishing state to the illuminating state (see FIG. 11C) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamp (for example, the first head lamp 18A) illuminating an insufficient luminance direction so that the direction becomes more luminant. In this manner, the left portion of the captured image becomes luminant, resulting in an image with the proper clearness shown in FIG. 10A.

When a captured image is the image shown in FIG. 10D in a state where the traveling body 2 is autonomously traveling forward with the illuminating pattern that is shown in FIG. 11A, the grading unit 15h grades the clearness of the image as "poor (insufficient luminance in overall)". The controller 15 changes the control relating to a way of lighting of the illumination lamps 17 based on this grading. Specifically, the controller 15 changes the illuminating lamp (for example, the first work lamp 19A) for illuminating an insufficient luminance direction from the extinguishing state to the illuminating state (see FIG. 11D) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamps (for example, the first head lamp 18A and the second head lamp 18B) illuminating an insufficient luminance direction so that the direction becomes more luminant. In this manner, the overall portion of the captured image becomes luminant, resulting in an image with the proper clearness shown in FIG. 10A.

Figure 11D:
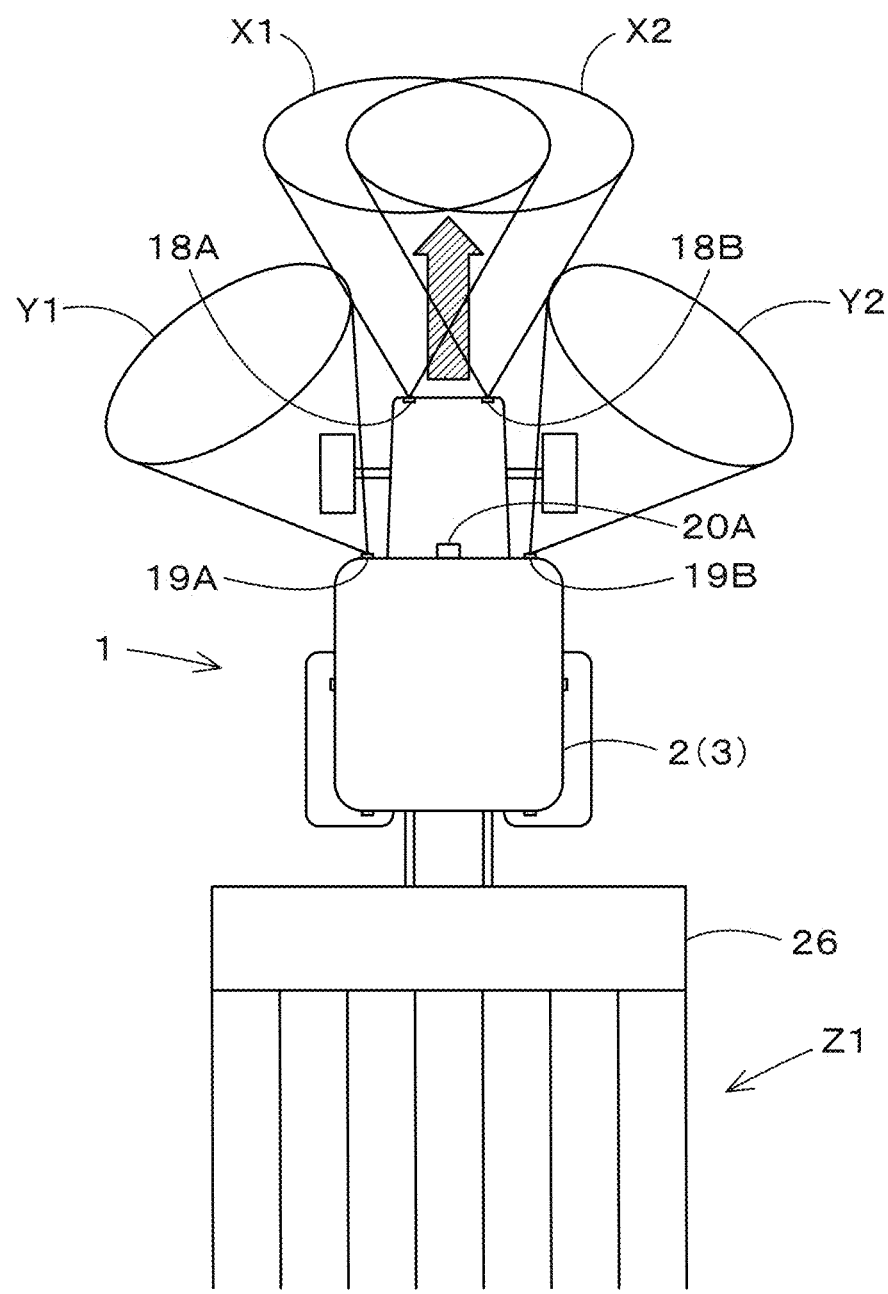
FIG. 11D is an explanation view of changing the control relating to the way of lighting the illumination lamps by the controller.

When a captured image is the image shown in FIG. 10E in a state where the traveling body 2 is autonomously traveling forward with the illuminating pattern that is shown in FIG. 11D, the grading unit 15h grades the clearness of the image as "poor (excessive luminance in right portion)". The controller 15 changes the control relating to a way of lighting of the illumination lamps 17 based on this grading. Specifically, the controller 15 changes the illuminating lamp (for example, the second work lamp 19B) for illuminating an excessive luminance direction from the illuminating state to the extinguishing state (see FIG. 11C) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamp (for example, the second work lamp 19B) illuminating an excessive luminance direction so that the direction becomes darker. In this manner, the right portion of the captured image becomes dark, resulting in an image with the proper clearness shown in FIG. 10A.

When a captured image is the image shown in FIG. 10F in a state where the traveling body 2 is autonomously traveling forward with the illuminating pattern that is shown in FIG. 11D, the grading unit 15h grades the clearness of the image as "poor (excessive luminance in left portion)". The controller 15 changes the control relating to a way of lighting of the illumination lamps 17 based on this grading. Specifically, the controller 15 changes the illuminating lamp (for example, the first work lamp 19A) for illuminating an excessive luminance direction from the illuminating state to the extinguishing state (see FIG. 11B) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamp (for example, the first work lamp 19A) illuminating an excessive luminance direction so that the direction becomes darker. In this manner, the left portion of the captured image becomes dark, resulting in an image with the proper clearness shown in FIG. 10A.

When a captured image is the image shown in FIG. 10G in a state where the traveling body 2 is autonomously traveling forward with the illuminating pattern that is shown in FIG. 11D, the grading unit 15h grades the clearness of the image as "poor (excessive luminance in overall)". The controller 15 changes the control relating to a way of lighting of the illumination lamps 17 based on this grading. Specifically, the controller 15 changes the illuminating lamps (for example, the first work lamp 19A and the second work lamp 19B) for illuminating an excessive luminance direction from the illuminating state to the extinguishing state (see FIG. 11A) among the plurality of illuminating lamps (that is, the first head lamp 18A, the second head lamp 18B, the first work lamp 19A, and the second work lamp 19B) that illuminate a capturing direction (forward) of the first camera 20A. Alternatively, the controller 15 changes the illumination of the illuminating lamps (for example, the first head lamp 18A, the second head lamp 18B, the first work lamp 19A, and the second work lamp 19B) illuminating an excessive luminance direction so that the direction becomes darker. In this manner, the left portion of the captured image becomes dark, resulting in an image with the proper clearness shown in FIG. 10A.

In selecting the illumination lamps 17 by the controller 15 as described above, it is preferable to select at least two or more illumination lamps 17 so that light can be irradiated to a capturing object from multiple directions in order to prevent the captured image G1 from capturing shadows and becoming dark.

According to the above-mentioned working vehicle 1, the following effects are provided.

The working vehicle 1 includes the traveling body 2 to autonomously travel on the target traveling route R1, the plurality of illumination lamps 17 located on the traveling body 2 to respectively illuminate different directions, and the controller to change a control relating to a way of lighting the illumination lamps 17 during the autonomously traveling.

According to this configuration, in the working vehicle 1 that is autonomously traveling on the target traveling route R1, the controller 15 is capable of changing the control relating to a way of lighting of the illumination lamps 17 during autonomous traveling, so that appropriate illuminating can be provided to enable an operator to reliably confirm the presence or absence of obstacles on the target traveling route R1 during the autonomous traveling.

In addition, before the traveling body 2 changes direction, the controller 15 turns on some of the illumination lamps 17 to illuminate a target direction to be set as a subsequent traveling direction after the changing direction based on the target traveling route R1.

According to this configuration, in the working vehicle 1 that is autonomously traveling on the target traveling route R1, it is possible to appropriately illuminate the traveling direction before the changing direction and to enable an operator to reliably confirm the presence or absence of obstacles on the target traveling route R1.

In addition, the working vehicle 1 includes the camera located on the traveling body 2 to capture an image of surroundings of the traveling body 2, the grading unit 15h to grade clearness of the image captured by the camera 20, and the display 14 to display the image captured by the camera 20. The controller changes the control relating to a way of lighting the illumination lamps 17 based on the clearness graded by the grading unit 15h.

According to this configuration, when an image by the camera 20 becomes unclear due to excessive or insufficient luminance of the illumination lamps 17, the controller 15 can eliminate the excessive or insufficient luminance by changing the control relating to a way of lighting of the illumination lamps 17. In this manner, the image by the camera 20 becomes clear, and a clear image can be displayed on the display 14.

In addition, the controller 15 selects and turns on one or more of the illumination lamps illuminating a capturing direction of the camera, based on the clearness graded by the grading unit 15h.

According to this configuration, when an image by the camera 20 becomes unclear due to excessive or insufficient luminance of the illumination lamps 17, the controller 15 selects and turns on one or more of the plurality of illumination lamps that illuminate the capturing direction of the camera 20, thus eliminating excessive or insufficient luminance to eliminate unclearness of the image.

In addition, the controller 15 changes an illuminance of the illumination lamp 17 illuminating the capturing direction of the camera 20, based on the clearness graded by the grading unit 15h.

According to this configuration, when an image by the camera 20 becomes unclear due to excessive or insufficient luminance of the illumination lamps 17, the controller 15 changes illuminance of the illumination lamp 17 illuminating the capturing direction of the camera 20, thus eliminating the excessive or insufficient luminance to eliminate unclearness of the image.

In addition, the controller 15 includes the storage to store a plurality of illuminating patterns each of which defines a combination of the illumination lamps 17 including one or more illumination lamps to be lighted and one or more illumination lamps to be extinguished, and the illuminating pattern selector 15f to select, based on the target traveling route, one of the illuminating patterns stored in the storage so as to illuminate the target direction to be set as the subsequent traveling direction after the traveling body 2 changes direction.

According to this configuration, the illuminating pattern selector 15f selects the most suitable illuminating pattern from a plurality of illuminating patterns, thus appropriately illuminating a traveling direction of the traveling body 2 without a complicated control.

In addition, the working vehicle 1 includes the illuminance sensor 21 to measure an illuminance around the traveling body 2. The illuminating pattern selector 15f selects one of the illuminating patterns based on the illuminance measured by the illuminance sensor 21.

According to this configuration, an illuminating pattern is selected based on illuminance around the traveling body 2, and thus the traveling direction of the traveling body 2 can be illuminated in appropriate illuminance.

In addition, the working vehicle 1 includes the camera located on the traveling body 2 to capture an image of surroundings of the traveling body 2, and the display 14 to display the image captured by the camera 20. The controller 15 includes the image quality estimating unit 15g to estimate, based on the illuminance measured by the illuminance sensor 20, an image quality of an image to be displayed on the display 14, and the illuminating pattern selector 15f selects one of the illuminating patterns so that the image quality estimated by the image quality estimating unit 15g satisfies a predetermined condition where the image quality can be suitable for recognition of a capturing object.

According to this configuration, the illuminating pattern selector 15f selects an illuminating pattern to satisfy a predetermined condition in which an image quality estimated by the image quality estimating unit 15g can be suitable for recognizing a capturing object, thus an image displayed on the display 14 can have a good image quality suitable for recognizing the capturing object, and thus an operator viewing the display 14 can stably recognize obstacles and other objects.

In addition, the working vehicle 1 includes the cabin 12 mounted on the traveling body 12. The illumination lamps 17 include a plurality of work lamps 19 attached to an upper portion of the cabin 12.

According to this configuration, the plurality of work lamps 19 attached to an upper portion of the cabin 12 can illuminate a traveling direction after changing direction. Thus, the traveling direction can be reliably illuminated without new special illuminating lamps.

In addition, the illumination lamps 17 include a plurality of head lamps 18 attached to a front portion of the traveling body 2.

According to this configuration, the plurality of work lamps 19 attached to the upper portion of the cabin 12 and the plurality of head lamps 18 attached to a front portion of the traveling body 2 can illuminate a traveling direction after changing direction. Thus, the traveling direction can be reliably illuminated.

In addition, the display 14 is a mobile terminal capable of being arranged at a position separating from the traveling body 2.

According to this configuration, an operator can view an image captured by the camera 20 via the display (that is, a mobile terminal) 14 at a distance from the traveling body 2. Accordingly, it is possible to monitor (that is, to remotely monitor) autonomous traveling of the tractor 1 from a remote location by viewing the display 14 that displays clear images with appropriate illumination.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a traveling body to autonomously travel on a target traveling route;
    a plurality of illumination lamps located on the traveling body to respectively illuminate different directions; and
    a controller configured or programmed to change a control relating to a way of lighting the illumination lamps during the autonomous travel; wherein
    before the traveling body changes direction, the controller is configured or programmed to selectively light at least one of the illumination lamps based on the target traveling route so that the selectively lighted at least one illumination lamp illuminates a target direction to be set as a subsequent traveling direction after the changing direction; and
    the controller is configured or programmed to include:
        a storage to store a plurality of illuminating patterns each of which defines a combination of the illumination lamps including one or more illumination lamps to be lighted and other one or more illumination lamps to be extinguished; and
        an illuminating pattern selector to select, based on the target traveling route, one of the illuminating patterns stored in the storage so as to illuminate a target direction to be set as a subsequent traveling direction for the traveling body after the changing direction.

2. The working vehicle according to claim 1, further comprising:
    a camera located on the traveling body to capture an image of surroundings of the traveling body;
    a grader to grade clearness of the image captured by the camera; and
    a display to display the image captured by the camera; wherein
    the controller is configured or programmed to change the control relating to the way of lighting the illumination lamps based on the clearness graded by the grader.

3. The working vehicle according to claim 2, wherein the controller is configured or programmed to selectively light at least one of the illumination lamps to illuminate a capturing direction of the camera, based on the clearness graded by the grader.

4. The working vehicle according to claim 2, wherein the controller is configured or programmed to change an illuminance of the illumination lamp illuminating the capturing direction of the camera, based on the clearness graded by the grader.

5. The working vehicle according to claim 2, wherein the display is a mobile terminal capable of being arranged at a position separate from the traveling body.

6. The working vehicle according to claim 1, further comprising:
an illuminance sensor to measure an illuminance around the traveling body; wherein
the illuminating pattern selector is configured or programmed to select one of the illuminating patterns based on the illuminance measured by the illuminance sensor.

7. The working vehicle according to claim 6, further comprising:
a camera located on the traveling body to capture an image of surroundings of the traveling body; and
a display to display the image captured by the camera; wherein
the controller is configured or programmed to include:
an image quality estimator to estimate, based on the illuminance measured by the illuminance sensor, an image quality of an image to be displayed on the display; and
the illuminating pattern selector selects one of the illuminating patterns so that the image quality estimated by the image quality estimator satisfies a predetermined condition where the image quality fits for recognition of a captured object.

8. The working vehicle according to claim 7, wherein the display is a mobile terminal capable of being arranged at a position separate from the traveling body.

9. A working vehicle comprising:
a traveling body to autonomously travel on a target traveling route;
a plurality of illumination lamps located on the traveling body to respectively illuminate different directions;
a controller configured or programmed to change a control relating to a way of lighting the illumination lamps during the autonomous travel; and
a cabin mounted on the traveling body; wherein
the illumination lamps include a plurality of work lamps attached to an upper portion of the cabin.

10. The working vehicle according to claim 9, wherein the illumination lamps include a plurality of head lamps attached to a front portion of the traveling body.

* * * * *